United States Patent
Lashinski et al.

(10) Patent No.: US 12,544,092 B2
(45) Date of Patent: Feb. 10, 2026

(54) DEVICES, SYSTEMS, AND METHODS FOR TRANSSEPTAL PUNCTURE

(71) Applicant: Laminar, Inc., Santa Rosa, CA (US)

(72) Inventors: Randall T. Lashinski, Windsor, CA (US); Joshua J. Dwork, Santa Rosa, CA (US); Michael James Lee, Santa Rosa, CA (US)

(73) Assignee: Laminar, Inc., Santa Rosa, CA (US)

( * ) Notice: Subject to any disclaimer, the term of this patent is extended or adjusted under 35 U.S.C. 154(b) by 308 days.

(21) Appl. No.: 18/190,661

(22) Filed: Mar. 27, 2023

(65) Prior Publication Data

US 2023/0310018 A1 Oct. 5, 2023

Related U.S. Application Data

(60) Provisional application No. 63/362,042, filed on Mar. 28, 2022.

(51) Int. Cl.
*A61B 17/32* (2006.01)
*A61B 17/00* (2006.01)

(52) U.S. Cl.
CPC .............. *A61B 17/32002* (2013.01); *A61B 2017/00247* (2013.01)

(58) Field of Classification Search
CPC ............ A61M 2210/122; A61M 25/06; A61M 2025/009; A61M 2210/125; A61M 2025/00; A61B 17/3496; A61B 2090/08021; A61B 2017/00243; A61B 18/1492; A61B 2018/00351; A61B 2018/00357; A61B 2018/00601; A61B 18/1477; A61B 2018/144; A61B 2017/22042; A61B 17/32053;
(Continued)

(56) References Cited

U.S. PATENT DOCUMENTS 5,006,106 A 4/1991 Angelchik
5,919,207 A 7/1999 Taheri
(Continued)

FOREIGN PATENT DOCUMENTS

EP 1441649 B1 8/2011
EP 3013249 8/2018
(Continued)

OTHER PUBLICATIONS

U.S. Appl. No. 18/153,311, filed Jan. 11, 2023, Lashinski et al.
(Continued)

*Primary Examiner* — Katherine M Shi
(74) *Attorney, Agent, or Firm* — FBT Gibbons LLP

(57) ABSTRACT

Various devices, apparatuses, and methods for transseptal puncture and crossing are disclosed herein. A transseptal puncture and crossing device can include novel puncture member having a crossing coil mated to a body portion to be able to both cross a tissue and allow a wire or guard be inserted through the puncture member. Though not required, the puncture member can have one or more of novel features, including a tapered coil portion, a transition cutter, a gripper coil portion, an atraumatic guard, and a shaped cutting wire. Methods for transseptal punctures and crossing include adding rotation, oscillation and/or ultrasound to a transseptal puncture device.

27 Claims, 30 Drawing Sheets

(58) Field of Classification Search
CPC .... A61B 2018/1425; A61B 2018/1432; A61B 17/32002; A61B 2017/00247; A61B 2017/00309; A61B 2017/3458; A61B 17/3478; A61B 2017/349
See application file for complete search history.

(56) References Cited

U.S. PATENT DOCUMENTS

| | | |
|---|---|---|
| 6,290,674 B1 | 9/2001 | Roue et al. |
| 6,463,331 B1 | 10/2002 | Edwards |
| 6,626,930 B1 | 9/2003 | Allen et al. |
| 6,652,556 B1 | 11/2003 | VanTassel et al. |
| 6,773,440 B2 | 8/2004 | Gannoe et al. |
| 6,969,396 B2 | 11/2005 | Krolik et al. |
| 7,025,756 B2 | 4/2006 | Frazier et al. |
| 7,044,134 B2 | 5/2006 | Khairkhahan et al. |
| 7,115,110 B2 | 10/2006 | Frazier et al. |
| 7,122,043 B2 | 10/2006 | Greenhalgh et al. |
| 7,128,073 B1 | 10/2006 | van der Burg et al. |
| 7,226,458 B2 | 6/2007 | Kaplan et al. |
| 7,320,665 B2 | 1/2008 | Vijay |
| 7,357,815 B2 | 4/2008 | Shaoulian et al. |
| 7,442,207 B2 | 10/2008 | Rafiee |
| 7,559,936 B2 | 7/2009 | Levine |
| 7,566,336 B2 | 7/2009 | Corcoran et al. |
| 7,645,285 B2 | 1/2010 | Cosgrove et al. |
| 7,648,532 B2 | 1/2010 | Greenhalgh et al. |
| 7,655,040 B2 | 2/2010 | Douk et al. |
| 7,695,510 B2 | 4/2010 | Bloom et al. |
| 7,713,282 B2 | 5/2010 | Frazier et al. |
| 7,722,641 B2 | 5/2010 | van der Burg et al. |
| 7,727,249 B2 | 6/2010 | Rahmani |
| 7,736,392 B2 | 6/2010 | Starkebaum |
| 7,758,639 B2 | 7/2010 | Mathis |
| 7,780,683 B2 | 8/2010 | Roue et al. |
| 7,828,716 B2 | 11/2010 | Burton et al. |
| 7,984,717 B2 | 7/2011 | Tropsha et al. |
| 8,043,329 B2 | 10/2011 | Khairkhahan et al. |
| 8,070,671 B2 | 12/2011 | Deem et al. |
| 8,097,015 B2 | 1/2012 | Devellian |
| 8,197,496 B2 | 6/2012 | Roue et al. |
| 8,236,050 B2 | 8/2012 | Bolling et al. |
| 8,287,557 B2 | 10/2012 | To et al. |
| 8,323,309 B2 | 12/2012 | Khairkhahan et al. |
| 8,443,808 B2 | 5/2013 | Brensel et al. |
| 8,512,403 B2 | 8/2013 | Navia et al. |
| 8,523,897 B2 | 9/2013 | van der Burg et al. |
| 8,551,161 B2 | 10/2013 | Dolan |
| 8,603,137 B2 | 12/2013 | Voss et al. |
| 8,690,911 B2 | 4/2014 | Miles et al. |
| 8,758,395 B2 | 6/2014 | Kleshinski et al. |
| 8,764,793 B2 | 7/2014 | Lee |
| 8,771,297 B2 | 7/2014 | Miller et al. |
| 8,777,926 B2 | 7/2014 | Chang et al. |
| 8,784,469 B2 | 7/2014 | Kassab |
| 8,784,482 B2 | 7/2014 | Rahdert et al. |
| 8,840,641 B2 | 9/2014 | Miles et al. |
| 8,845,711 B2 | 9/2014 | Miles et al. |
| 8,851,077 B2 | 10/2014 | Brensel et al. |
| 8,968,284 B2 | 3/2015 | Thomas et al. |
| 9,023,080 B2 | 5/2015 | Ciobanu et al. |
| 9,089,311 B2 | 7/2015 | Fortson et al. |
| 9,095,363 B2 | 8/2015 | Van Bladel et al. |
| 9,186,152 B2 | 11/2015 | Campbell et al. |
| 9,220,487 B2 | 12/2015 | Davis et al. |
| 9,314,249 B2 | 4/2016 | Kreidler et al. |
| 9,326,857 B2 | 5/2016 | Carledge et al. |
| 9,358,009 B2 | 6/2016 | Yock et al. |
| 9,427,220 B2 | 8/2016 | Whitman et al. |
| 9,554,804 B2 | 1/2017 | Erzberger et al. |
| 9,572,584 B2 | 2/2017 | Miles et al. |
| 9,592,058 B2 | 3/2017 | Erzberger et al. |
| 9,597,086 B2 | 3/2017 | Larsen et al. |
| 9,615,926 B2 | 4/2017 | Lashinski et al. |
| 9,649,115 B2 | 5/2017 | Edmiston et al. |
| 9,662,117 B2 | 5/2017 | Forsell |
| 9,675,360 B2 | 6/2017 | Baker |
| 9,693,780 B2 | 7/2017 | Miles et al. |
| 9,693,781 B2 | 7/2017 | Miles et al. |
| 9,707,124 B2 | 7/2017 | Brensel et al. |
| 9,717,488 B2 | 8/2017 | Kassab |
| 9,763,666 B2 | 9/2017 | Wu et al. |
| 9,795,480 B2 | 10/2017 | Bolling et al. |
| 9,795,481 B2 | 10/2017 | Callas et al. |
| 9,808,253 B2 | 11/2017 | Li et al. |
| 9,826,980 B2 | 11/2017 | Figulla et al. |
| 9,883,864 B2 | 2/2018 | Miles et al. |
| 9,918,719 B2 | 3/2018 | Konstantino et al. |
| 9,937,042 B2 | 4/2018 | Cabiri et al. |
| 9,987,017 B2 | 6/2018 | Smith et al. |
| 10,064,628 B2 | 9/2018 | Edmiston et al. |
| 10,071,226 B2 | 9/2018 | Hsueh et al. |
| 10,098,640 B2 | 10/2018 | Bertolero et al. |
| 10,143,456 B2 | 12/2018 | Javois |
| 10,143,478 B2 | 12/2018 | Forbes |
| 10,238,398 B2 | 3/2019 | Hughett, Sr. et al. |
| 10,278,705 B2 | 5/2019 | Amin et al. |
| 10,299,799 B1 | 5/2019 | DeMeritt |
| 10,307,165 B2 | 6/2019 | Henderson et al. |
| 10,307,620 B2 | 6/2019 | Burdette |
| 10,386,990 B2 | 8/2019 | Shikham et al. |
| 10,405,866 B2 | 9/2019 | Chakroborty et al. |
| 10,420,564 B2 | 9/2019 | Miles et al. |
| 10,433,998 B2 | 10/2019 | Keren et al. |
| 10,441,258 B2 | 10/2019 | Corcoran et al. |
| 10,531,878 B2 | 1/2020 | Slaughter et al. |
| 10,537,332 B2 | 1/2020 | Edmiston et al. |
| 10,582,929 B2 | 3/2020 | Miles et al. |
| 10,582,930 B2 | 3/2020 | Miles et al. |
| 10,624,648 B2 | 4/2020 | Li et al. |
| 10,631,969 B2 | 4/2020 | Edmiston et al. |
| 10,695,070 B2 | 6/2020 | Miles et al. |
| 10,702,274 B2 | 7/2020 | Groothuis et al. |
| 10,709,432 B2 | 7/2020 | Ma |
| 10,709,454 B2 | 7/2020 | Li et al. |
| 10,722,240 B1 | 7/2020 | Melanson et al. |
| 10,758,241 B1 | 9/2020 | Lashinski et al. |
| 10,898,202 B2 | 1/2021 | Slaughter et al. |
| 11,039,822 B2 | 6/2021 | Wang et al. |
| 11,116,510 B2 | 9/2021 | Melanson et al. |
| 11,123,080 B2 | 9/2021 | Lashinski et al. |
| 11,219,462 B2 | 1/2022 | Lashinski et al. |
| 11,399,843 B2 | 8/2022 | Lashinski et al. |
| 11,432,809 B2 | 9/2022 | Inouye et al. |
| 11,497,505 B2 | 11/2022 | Slaughter et al. |
| 11,540,835 B2 | 1/2023 | Groothuis et al. |
| 11,540,836 B2 | 1/2023 | Wang et al. |
| 11,547,417 B2 | 1/2023 | Li et al. |
| 11,596,533 B2 | 3/2023 | Inouye et al. |
| 2003/0040771 A1 | 2/2003 | Hyodoh et al. |
| 2003/0057156 A1 | 3/2003 | Peterson et al. |
| 2003/0181942 A1 | 9/2003 | Sutton et al. |
| 2004/0186566 A1 | 9/2004 | Hindrichs et al. |
| 2005/0004652 A1 | 1/2005 | van der Burg et al. |
| 2005/0177180 A1 | 8/2005 | Kaganov et al. |
| 2005/0187568 A1 | 8/2005 | Klenk et al. |
| 2005/0273119 A1 | 12/2005 | Widomski et al. |
| 2005/0288722 A1 | 12/2005 | Eigler et al. |
| 2006/0287661 A1 | 12/2006 | Bolduc et al. |
| 2007/0073337 A1 | 3/2007 | Abbott et al. |
| 2007/0118213 A1 | 5/2007 | Loulmet |
| 2007/0198057 A1 | 8/2007 | Gelbart et al. |
| 2008/0294175 A1 | 11/2008 | Bardsley et al. |
| 2008/0319254 A1 | 12/2008 | Nikolic et al. |
| 2009/0171386 A1 | 7/2009 | Amplatz et al. |
| 2009/0209986 A1 | 8/2009 | Stewart et al. |
| 2010/0030328 A1 | 2/2010 | Sequin et al. |
| 2010/0185235 A1 | 7/2010 | Kassab et al. |
| 2010/0274129 A1* | 10/2010 | Hooven ............ A61M 25/0084 606/190 |
| 2011/0054515 A1 | 3/2011 | Bridgeman et al. |
| 2011/0178537 A1 | 7/2011 | Whitman |
| 2012/0221042 A1 | 8/2012 | Schwartz et al. |
| 2012/0265296 A1 | 10/2012 | McNamara et al. |

(56) References Cited

U.S. PATENT DOCUMENTS

| | | |
|---|---|---|
| 2012/0283585 A1 | 11/2012 | Werneth et al. |
| 2012/0316584 A1 | 12/2012 | Miles et al. |
| 2013/0197570 A1 | 8/2013 | Ebata et al. |
| 2013/0338686 A1 | 12/2013 | Ruiz |
| 2014/0018841 A1 | 1/2014 | Peiffer et al. |
| 2014/0135817 A1 | 5/2014 | Tischler et al. |
| 2015/0005809 A1 | 1/2015 | Ayres et al. |
| 2015/0005810 A1 | 1/2015 | Center et al. |
| 2015/0209049 A1 | 7/2015 | Bernstein et al. |
| 2015/0342612 A1 | 12/2015 | Wu et al. |
| 2016/0058434 A1 | 3/2016 | Delaloye et al. |
| 2016/0095603 A1 | 4/2016 | McGuckin, Jr. et al. |
| 2016/0270810 A1 | 9/2016 | Vardi et al. |
| 2016/0278749 A1 | 9/2016 | Javois et al. |
| 2016/0317174 A1* | 11/2016 | Dake .................. A61B 18/1492 |
| 2017/0095256 A1 | 4/2017 | Lindgren et al. |
| 2017/0202575 A1 | 7/2017 | Stanfield et al. |
| 2017/0224354 A1 | 8/2017 | Tischler et al. |
| 2017/0258475 A1 | 9/2017 | Mellmann et al. |
| 2017/0340336 A1 | 11/2017 | Osypka |
| 2018/0055496 A1 | 3/2018 | Hou et al. |
| 2018/0235640 A1 | 8/2018 | Slaughter et al. |
| 2018/0289487 A1 | 10/2018 | Alexander et al. |
| 2018/0303488 A1 | 10/2018 | Hill |
| 2018/0310925 A1 | 11/2018 | Inouye et al. |
| 2018/0310926 A1 | 11/2018 | Delaloye et al. |
| 2019/0069901 A1 | 3/2019 | Forbes |
| 2019/0083075 A1 | 3/2019 | Onushko et al. |
| 2019/0099195 A1* | 4/2019 | Carroll ............... A61B 17/3476 |
| 2019/0167242 A1 | 6/2019 | Rowe et al. |
| 2019/0183512 A1 | 6/2019 | Subramaniam et al. |
| 2019/0192754 A1 | 6/2019 | Kassab et al. |
| 2019/0209179 A1 | 7/2019 | Subramaniam et al. |
| 2019/0209180 A1 | 7/2019 | Kealey et al. |
| 2019/0321176 A1 | 10/2019 | Lashinski et al. |
| 2019/0374229 A1 | 12/2019 | Anderson et al. |
| 2020/0008870 A1 | 1/2020 | Gruba et al. |
| 2020/0038004 A1 | 2/2020 | Corcoran et al. |
| 2020/0107836 A1 | 4/2020 | O'Halloran et al. |
| 2020/0107837 A1 | 4/2020 | Slaughter et al. |
| 2020/0139102 A1 | 5/2020 | Ziebol et al. |
| 2020/0155164 A1 | 5/2020 | Edmiston et al. |
| 2020/0214714 A1 | 7/2020 | Li et al. |
| 2021/0113212 A1 | 4/2021 | Lashinski et al. |
| 2021/0212674 A1 | 7/2021 | Wang et al. |
| 2021/0298728 A1 | 9/2021 | Lashinski et al. |
| 2021/0369284 A1 | 12/2021 | Lashinski et al. |
| 2022/0022854 A1 | 1/2022 | Lashinski et al. |
| 2022/0040451 A1* | 2/2022 | Urbanski ............. A61M 25/04 |
| 2022/0087741 A1 | 3/2022 | Lashinski et al. |
| 2022/0175390 A1 | 6/2022 | Lee et al. |
| 2022/0175392 A1 | 6/2022 | Jayaraman |
| 2022/0211386 A1 | 7/2022 | Amplatz et al. |
| 2022/0218356 A1 | 7/2022 | Inouye et al. |
| 2022/0240941 A1 | 8/2022 | Lashinski et al. |
| 2022/0257955 A1 | 8/2022 | Zarbatany et al. |
| 2022/0370056 A1 | 11/2022 | Inouye et al. |
| 2022/0401109 A1 | 12/2022 | Zarbatany et al. |
| 2023/0033509 A1 | 2/2023 | Lashinski et al. |
| 2023/0048873 A1 | 2/2023 | Onushko et al. |
| 2023/0084301 A1 | 3/2023 | Groff et al. |
| 2023/0130379 A1 | 4/2023 | Akpinar et al. |
| 2023/0263531 A1 | 8/2023 | Lashinski et al. |

FOREIGN PATENT DOCUMENTS

| | | |
|---|---|---|
| EP | 3 494 902 | 6/2019 |
| EP | 3 632 337 | 4/2020 |
| EP | 3340890 B1 | 7/2022 |
| JP | 2010527742 A | 8/2010 |
| JP | 2016168173 A | 9/2016 |
| WO | WO 2004/082532 | 9/2004 |
| WO | WO 2008/150346 A1 | 12/2008 |
| WO | WO 2013/009998 | 1/2013 |
| WO | WO 2015/189307 | 12/2015 |
| WO | WO 2018/071717 | 4/2018 |
| WO | WO 2018/178979 | 10/2018 |
| WO | WO 2019/212894 | 11/2019 |
| WO | WO 2020/074738 | 4/2020 |
| WO | WO 2020/198259 | 10/2020 |
| WO | WO 2021/194964 | 9/2021 |
| WO | WO 2022/010931 | 1/2022 |
| WO | WO 2022/047333 | 3/2022 |
| WO | WO 2023/137343 A1 | 7/2023 |
| WO | WO 2023/192189 A1 | 10/2023 |

OTHER PUBLICATIONS

Farapulse, Inc., The IMPULSE Study: A Safety and Feasibility Study of the Farapulse Endocardial Ablation System to Treat Atrial Fibrillation, Mar. 11, 2019; 65 pages.

Watchman® Left Atrial Appendage Closure Device, Patient Information Guide; Boston Scientific; dated as copyright 2015; 9 pages.

Watchman® Left Atrial Appendage Closure Device, Product Brochure; dated as copyright 2018; 6 pages.

"Watchman Stroke Device Lawsuit;" https://www.nationalinjuryhelp.com/watchman-stroke-device-lawsuit/; 7 pages.

Cardia Delivery System, 1 page, dated as available at http://www.cardia.com/ds.html on Mar. 7, 2019 by the Wayback Machine internet archive (accessed and printed on May 6, 2020).

Cardia Fenestrated Fontan Closure System, 1 page, dated as available at http://www.cardia.com/fontan.html on Feb. 11, 2019 by the Wayback Machine internet archive (accessed and printed on May 6, 2020).

Densford, Fink, "Prominent cardiologist calls for a halt to Watchman implants;" https://www.massdevice.com/prominent-cardiologist-calls-for-a-halt-to-watchman-implants/; Nov. 10, 2016; 12 pages.

Kelley Drye & Warren LLP, "Texas Court dismisses off-label device marketing FCA case;" Lexology; Oct. 27, 2010; 2 pages.

Perriello, Brad, "Jury hands Covidien's ev3 subsidiary a possible $275M loss;" https://www.massdevice.com/jury-hands-covidiens-ev3-subsidiary-possible-275m-loss/; Aug. 13, 2013; 12 pages.

Rosenthal et al., "What is the efficacy and safety of devices for left atrial appendage (LAA) closure/litigation in atrial fibrillation (Afib) AF)?;" Medscape; Jul. 25, 2019; 2 pages.

Ultrasept Cribriform Device, 1 page, dated as available at http://www.cardia.com/cribriform.html on Feb. 11, 2019 by the Wayback Machine internet archive (accessed and printed on May 6, 2020).

Ultrasept Left Atrial Appendage Closure Device, 1 page, dated as available at http://www.cardia.com/laa.html on Mar. 7, 2019 by the Wayback Machine internet archive (accessed and printed on May 6, 2020).

Ultrasept Patent Foramen Ovale Closure Device, 1 page dated as available at http://www.cardia.com/pfo.html on of Mar. 7, 2019 by the Wayback Machine internet archive (accessed and printed on May 6, 2020).

Ultrasept Atrial Septal Defect Closure Device, http://www.cardia.com/asd.html, 1 page, dated as available as of Mar. 7, 2019 by the Wayback Machine internet archive (accessed and printed on May 6, 2020).

International Search Report and Written Opinion for PCT Application No. PCT/US2023/016433 mailed Jun. 7, 2023; 14 pages.

* cited by examiner

DEVICES, SYSTEMS, AND METHODS FOR TRANSSEPTAL PUNCTURE

FIELD OF THE DISCLOSURE

Embodiments of the present disclosure relate to devices, apparatuses, and methods for transseptal puncture and crossing.

BACKGROUND

Transseptal puncture is a procedure performed to gain access to the left atrial by puncturing the fossa ovalis (FO). The interatrial septum, formed by fusion of the septum primum and secundum, divides the cavity of the left and right atrium and should be clearly differentiated from the septal wall of the right atrium, which extends both superiorly and inferiorly beyond the left atrial cavity. The interatrial septum is anatomical target for transseptal puncture and is anatomically represented by FO and its adjacent muscular margins. The FO has an average vertical diameter of 18.5 mm and an average horizontal diameter of 10 mm, 4 with a mean thickness of 1 to 2 mm.

Transseptal puncture remains a demanding procedural step in accessing the left atrium with inherent risks and safety concerns, including inadvertent cardiac perforation or damage, cardiac tamponade, and other damage. The procedure has been traditionally performed from the right femoral vein through the FO. Commonly used septal perforation methods include needle puncture and radiofrequency perforation.

SUMMARY OF SOME EXEMPLIFYING EMBODIMENTS

The systems, methods and devices of this disclosure each have several innovative aspects, implementations, or aspects, no single one of which is solely responsible for the desirable attributes disclosed herein.

Disclosed herein are embodiments of transseptal puncture devices and methods of transseptal puncturing and crossing.

Some embodiments of the transseptal puncture device for creating a hole in a septum or other tissue of a patient include an elongate body portion, a coiled portion distal to the body portion, a longitudinally extending lumen extending axially through an entire length of the elongate body portion and the coiled portion. The coiled portion has a distal end and a proximal end, the proximal end being closer to the body portion. The distal end of the coiled portion is sharp. The transseptal puncture device is configured to create an opening in the septum of the patient by advancing the distal end of the coiled portion into contact with the septum and rotating the device in a first direction.

A variation to the embodiments above is, wherein the coiled portion comprises a helical wall having a thickness in an axial direction of the transseptal puncture device that increases along a length of the coiled portion from the distal end of the coiled portion to the proximal end of the coiled portion so as to increase a size of the opening in the septum as the coiled portion of the device is advanced through the opening in the septum.

A variation to the embodiments above is, wherein the thickness of the helical wall in the axial direction at the proximal end of the coiled portion is equal to or greater than an outer diameter of the coiled portion at the proximal end of the coiled portion.

A variation to the embodiments above is, wherein the thickness of the helical wall in the axial direction at a proximal end portion of the coiled portion adjacent to the proximal end of the coiled portion is at least twice as large as the thickness of the helical wall in the axial direction at a distal end portion of the coiled portion adjacent to the distal end of the coiled portion.

A variation to the embodiments above is, wherein the coiled portion comprises a gap between adjacent coils of the helical wall, wherein the gap has a constant width in an axial direction along a length of the coiled portion from the distal end of the coiled portion to the proximal end of the coiled portion.

A variation to the embodiments above is, wherein the gap comprises a gap distal portion that is located at a distal portion of the coiled portion and is between adjacent coils of the helical wall and a proximal gap portion that is located proximal to the distal gap portion.

A variation to the embodiments above is, wherein the proximal gap portion is located at or adjacent to the transition portion of the transseptal puncture device.

A variation to the embodiments above is, wherein the proximal gap portion extends in an axial direction.

A variation to the embodiments above further comprises a transitional gap portion between the proximal and distal gap portions, wherein an angle of the transitional gap portion relative to an axial centerline of the coiled portion is different than an angle of the distal gap portion relative to the axial centerline of the coiled portion.

A variation to the embodiments above is, wherein at least the body portion of the transseptal puncture device is flexible.

A variation to the embodiments above further comprises a transition portion between the body portion and the coiled portion, wherein the transition portion comprises a sharpened outer edge.

A variation to the embodiments above is, wherein the lumen extending through the body portion and the coiled portion is configured to receive a guidewire or a needle therein.

A variation to the embodiments above is, further comprises a needle configured to move axially within the lumen through the body portion and the coiled portion.

A variation to the embodiments above is, further comprises a helical guard comprising a guard body portion and a guard helical portion, wherein the helical guard is configured to move axially within the lumen through the body portion and the coiled portion, and wherein a distal end of the guard helical portion is configured to be blunt or atraumatic.

A variation to the embodiments above is, wherein the guard helical portion is configured such that, when the guard helical portion is advanced through the coiled portion, the guard helical portion interwinds with the coiled portion.

A variation to the embodiments above further comprises a distal coil guard configured to retractably extend out from the distal end of the coiled portion, wherein a distal end of the distal coil guard is configured to be blunt or atraumatic.

A variation to the embodiments above further comprises a removable cover disposed at the distal end of the coiled portion.

A variation to the embodiments above is, wherein at least the coiled portion is laser cut from a tube.

A variation to the embodiments above is, wherein the distal portion of the coiled portion further comprising serrations along one or more edges of the coiled portion.

A variation to the embodiments above is, wherein the distal portion of the coiled portion further comprising a hook-like tip.

A variation to the embodiments above is, wherein the coiled portion is formed from a wire or ribbon.

A variation to the embodiments above further comprises an electromechanical motion generator coupled with the body portion.

Another embodiments is directed to a method of transseptal puncture including advancing a coiled portion of the transseptal puncture device into contact with a septum in a patient's heart. The method also includes rotating the transseptal puncture device in a first direction to cause the coiled portion of the transseptal puncture device to puncture the transseptal puncture device. The method also includes rotating the transseptal puncture device in the first direction to cause the coiled portion of the transseptal puncture device to advance through the septum so that a wall of the septum surrounds at least a portion of a coiled portion of the transseptal puncture device. The method includes further rotating the transseptal puncture device to expand a size of a hole in the wall of the septum. The method further includes continuing to advance the transseptal puncture device to transition the wall of the septum from surrounding the coiled portion of the transseptal puncture device to surrounding an outside surface of a body portion of the transseptal puncture device.

A variation to the embodiments above further comprises piercing through the septum by extending a needle out through the coiled portion of the transseptal puncture device to create the hole in the wall of the septum before puncturing the septum with the coiled portion of the transseptal puncture device.

A variation to the embodiments above further comprises extending a blunt guard out through the coiled portion of the transseptal puncture before advancing the coiled portion of the transseptal puncture device into contact with the septum to prevent the transseptal puncture device from inadvertently puncturing or cutting the septum.

A variation to the embodiments above further comprises applying oscillation to the coiled portion of the transseptal puncture device to expand a size of the hole in the wall of the septum.

A variation to the embodiments above further comprises actuating the transseptal puncture with an electromechanical motion generator.

DETAILED DESCRIPTION OF THE SOME EXEMPLIFYING ARRANGEMENTS

Figure 1:
FIG. 1 shows a section view of a right atrium (RA) and a left atrium (LA), showing a guidewire advancing toward the FO.
Figure 2:
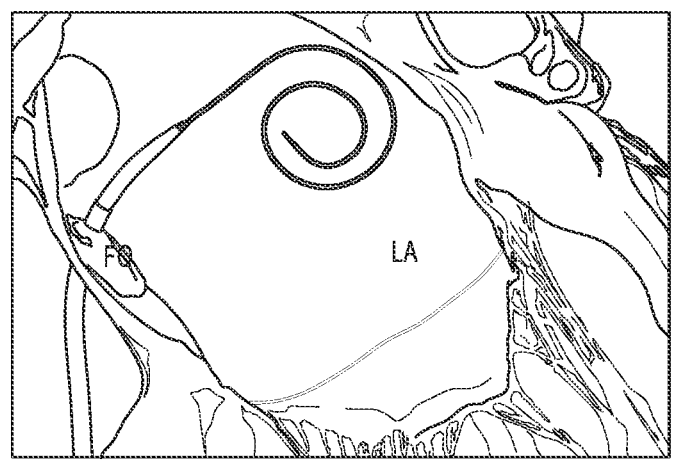
FIG. 2 shows a section view of a LA, showing a standard transseptal puncture device extending through the FO.
Figure 3A:
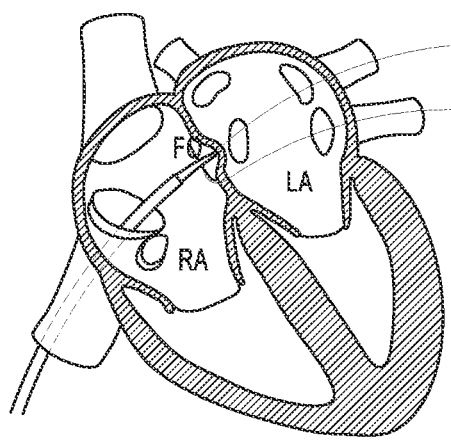
FIG. 3A shows a section view of a heart, showing a standard transseptal puncture device extending through the FO.
Figure 3B:
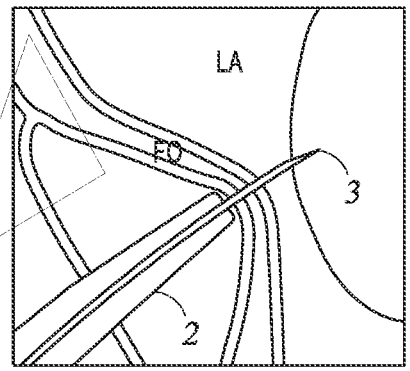
FIG. 3B shows a close-up section view of the standard transseptal puncture device from FIG. 3A, showing a wire of the standard transseptal puncture device piercing through the FO.
Figure 3C:
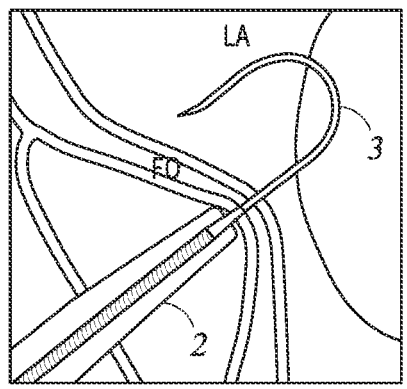
FIG. 3C shows a close-up section view of the standard transseptal puncture device from FIG. 3A, showing the wire advancing through the FO.
Figure 3D:
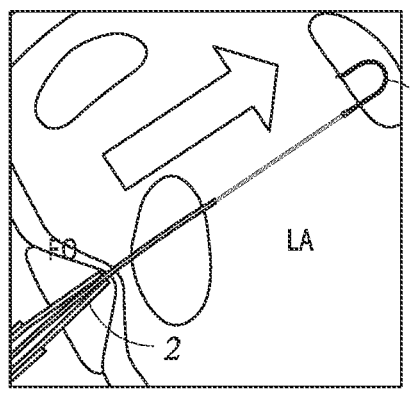
FIG. 3D shows a close-up section view of the standard transseptal puncture device from FIG. 3A, showing the wire advancing toward the LA.
Figure 3E:
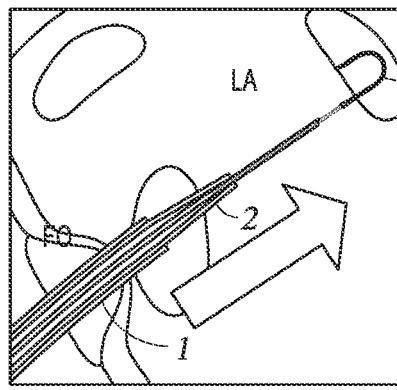
FIG. 3E shows a close-up section view of the standard transseptal puncture device from FIG. 3A, showing a sheath of the standard transseptal puncture device advancing through the FO.
Figure 4:
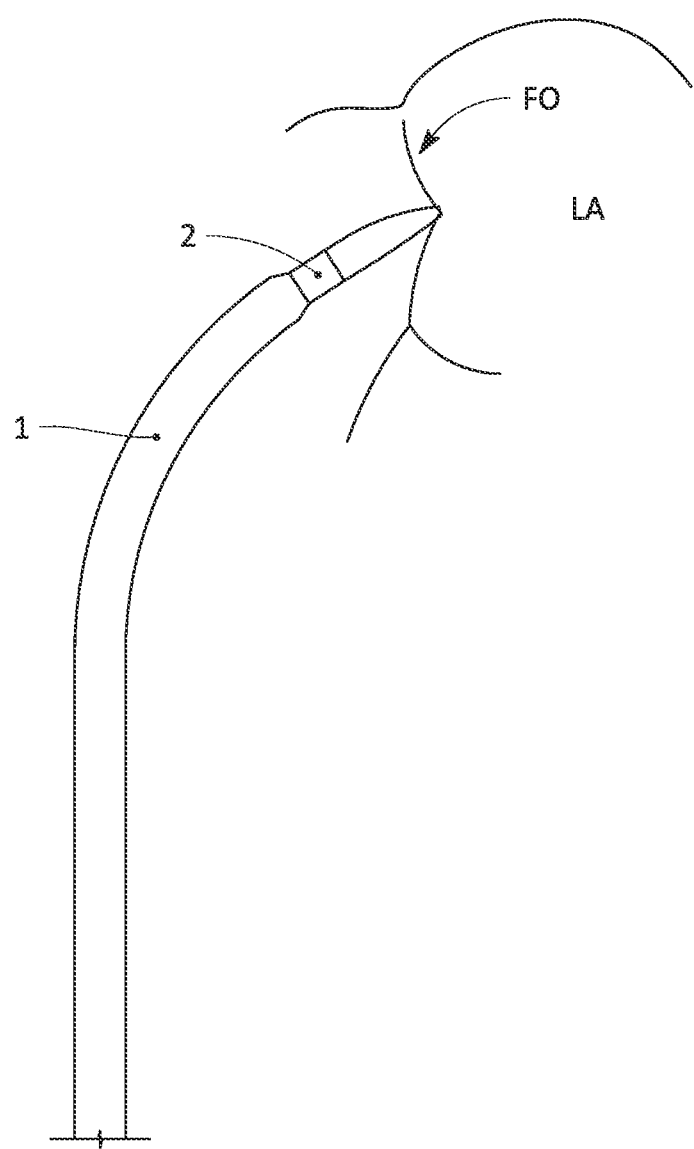
FIG. 4 shows a side view of a standard transseptal puncture device pressed against the FO.
Figure 5:
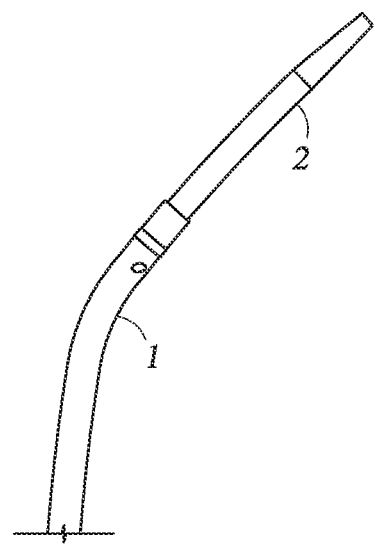
FIG. 5 shows a side close-up view of the standard transseptal puncture device from FIG. 4.

Described herein are embodiments of novel devices, systems, and methods for transseptal puncture and crossing. Transseptal puncture has been traditionally performed from the right femoral vein through the fossa ovalis (FO), as shown in FIGS. 1-5. A standard transseptal puncture device can include a sheath 1, a dilator 2 inserted through the sheath 1, and a needle 3 inserted through the dilator 2. A commonly used standard needle is the Brockenbrough needle which is inserted through the dilator of an 8-F, 63-cm Mullins sheath. A standard transseptal puncture device may apply a forward axial pressure to the FO and pierce through the FO using a needle 3 as shown in FIGS. 3A-3B.

1. Coil Crossing (General)

Illustrated and described below is an embodiment of a transseptal puncture device.

Rather than applying forward axial pressure to the FO with a needle, embodiments of the transseptal puncture device disclosed herein can be configured to apply a force that is tangential or at an acute angle (hereinafter, collectively referred to as an angled force) to the surface of the tissue or that has a tangential or acutely angled component of force. In this arrangement, some embodiments of the transseptal puncture devices disclosed herein can create an opening through the FO with much less axial or forward pressure than a traditional needle or straight hypotube. Embodiments of the transseptal puncture device are described herein in the context of use for creating an opening in the septum. However, any embodiment disclosed herein can be configured for creating an opening or passage in any tissue in the body and no embodiments disclosed are to be limited in scope for use only for creating an opening in the septum.

FIGS. 6-10 shows an embodiment of a transseptal puncture device 100 having a puncture member 13 (that can optionally be tubular) with a coiled portion 32 instead of a standard needle. In any embodiments disclosed herein, the puncture member 13 can have a body portion 36 and a coiled portion 32 at a distal end of the puncture member 13. The coiled portion 32 can be integrally formed with the body portion 36. For example and without limitation, the coiled portion 32 and the body portion 36 can be formed by laser cutting a hypotube.

The coiled portion 32 (also referred to herein as a helical portion) of the puncture member 13 can, in some embodiments, have a helical shape. For example, the coiled portion 32 can, in some embodiments, have a shape similar in some respects to that of a helical portion of a corkscrew for opening a bottle of wine. The coiled portion 32 can be configured such that, once engaged with the septum (e.g., when a distal tip 31 of the coiled portion 32 is in contact with the septum), rotating the puncture member 13 of the transseptal puncture device 100 while maintaining a pressure against the septum with the distal end of the coiled portion can create an opening in the septum in a very controlled manner. Continuing to rotate the puncture member 13 of the transseptal puncture device 100 will cause the coiled portion 32 to continue to advance through the septum or other tissue as long as a torque is applied to the puncture member 13. The puncture member 13 may either be used to stabilize the crossing location for a traditional needle that may follow through it, or it may perform the entire crossing by coiling through the tissue to create a hole or passage to the LA.

By limiting the forward pressure required from a needle and instead applying an angled force to the surface of the tissue using the puncture member 13, there is less risk of unexpected movement or "popping" through the tissue and contacting another portion of the heart. Different from the radio frequency (RF) methods of crossing that require a separate external power supply and generator, this mechanical method does not require external power.

Some embodiments of the transseptal puncture device 100 can include a standard transseptal dilator 2 and guiding sheath 1 designed for use with a standard crossing needle. In some embodiments, as shown in FIG. 6, a puncture member 13 can include a body portion 36 and a coiled portion 32, wherein a portion of the body portion 36 proximal to the coiled portion 32 can be flexible.

Figure 6:
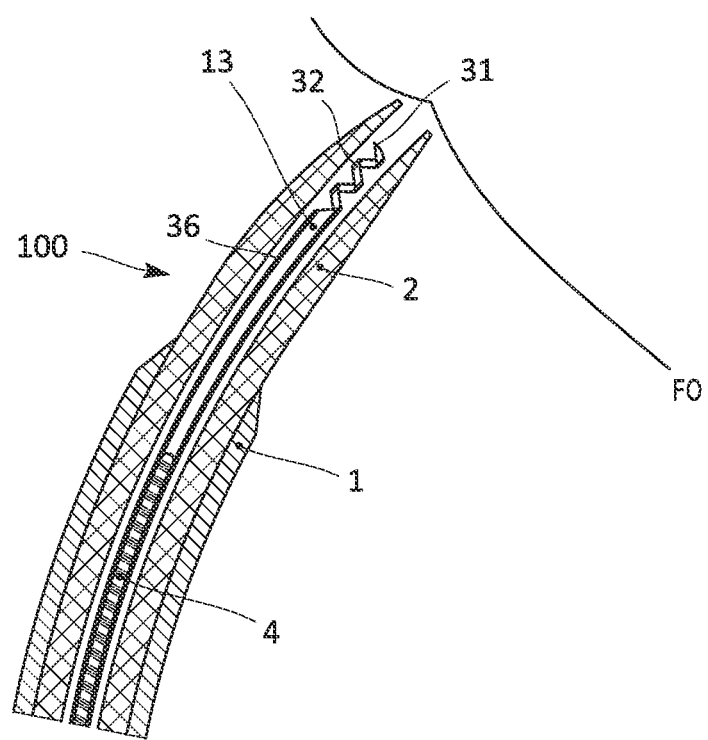
FIG. 6 shows a close-up section view of an embodiments of a transseptal puncture device with a puncture member, showing a dilator pressed against the FO.
Figure 7:
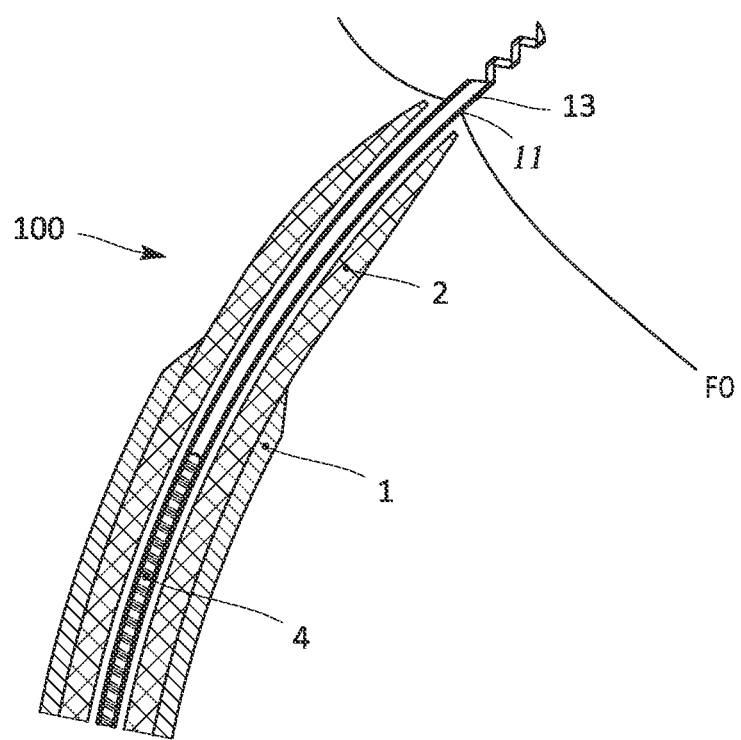
FIG. 7 shows a close-up section view of the transseptal puncture device from FIG. 6, with the puncture member advancing through the FO.
Figure 8:
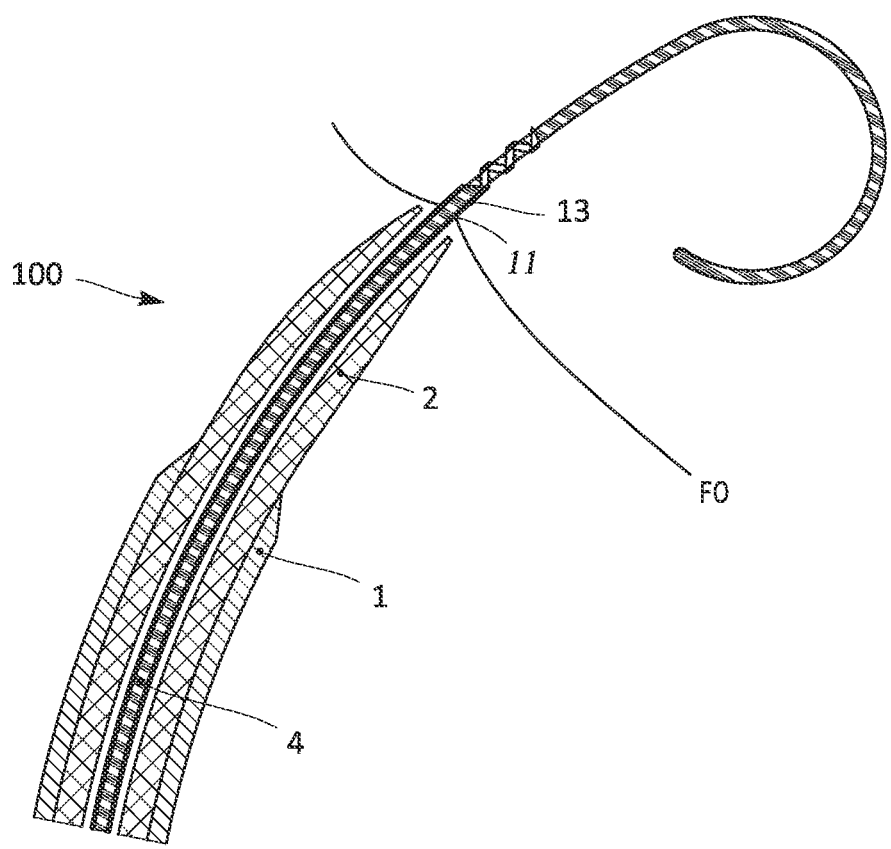
FIG. 8 shows a close-up section view of the transseptal puncture device from FIG. 6, with a wire advancing through the FO.
Figure 9:
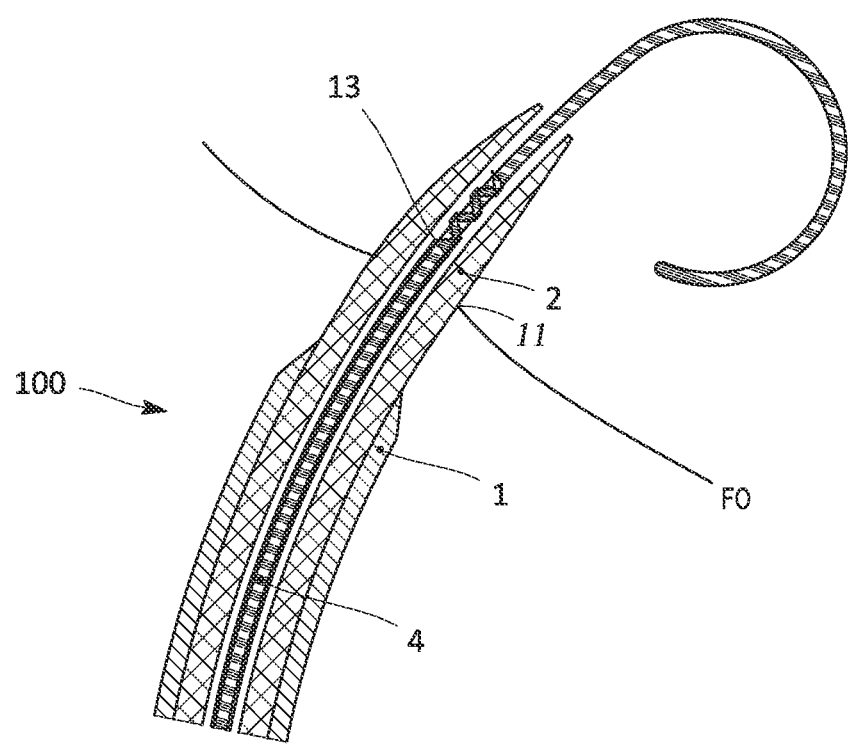
FIG. 9 shows a close-up section view of the transseptal puncture device from FIG. 6, with the dilator advancing through the FO.
Figure 10:
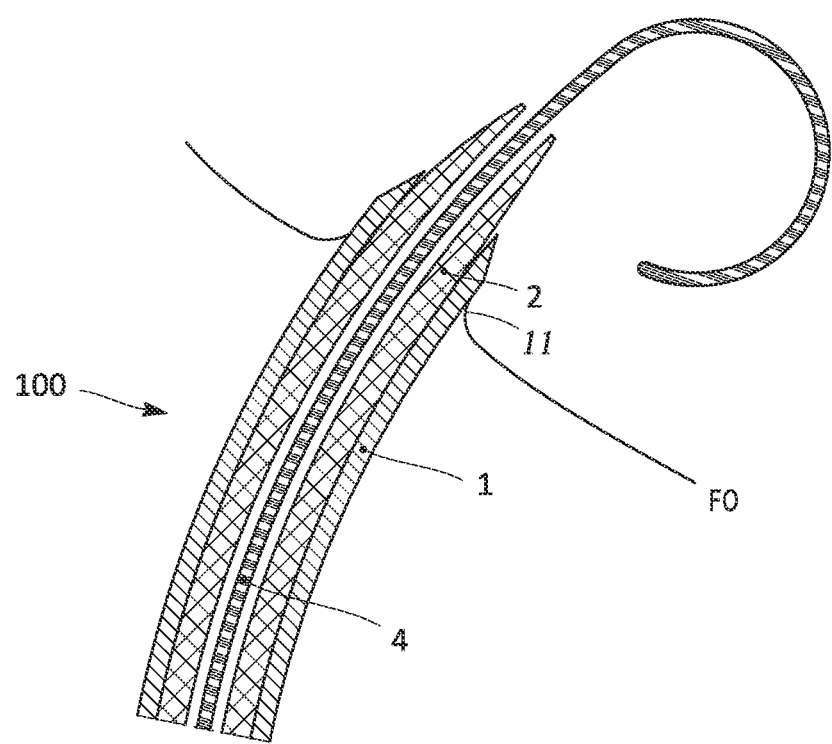
FIG. 10 shows a close-up section view of the transseptal puncture device from FIG. 6, with a sheath advancing through the FO.

As an initial step of a transseptal puncture procedure, the dilator 2 can be used to apply a slight axial forward pressure to the septum to "tent" the septum as a means to determine the appropriate location for crossing-use fluoroscopy and echo as shown in FIG. 6. In some embodiments, the puncture member 13 can initially be recessed in the dilator until advanced for use. The puncture member 13 can then be advanced to the septal tissue (FO) and then rotated, which pierces the tissue and drives the puncture member 13 across the septum as shown in FIG. 7. Once across, a standard guidewire 4 can be advanced through the puncture member 13 and the FO as shown in FIG. 8. The puncture member 13 can then be retracted back into the dilator 2, and the distal tip of the dilator 2 can be advanced through the septal wall hole 11 created by the puncture member 13 as shown in FIG. 9. The sheath 1 can then follow, further dilating the hole 11 in the FO to make access for subsequently larger devices to cross the FO.

In some embodiments, the coiled portion 32 of the puncture member 13 can be a multiple-start coil (e.g., two turns, three turns, etc.). In other embodiments, the coiled portion 32 can be a single-start coil (e.g., one single turn).

In some embodiments, the puncture member 13 can be hollow such that a guidewire or another device may pass through the puncture member 13. In other embodiments, the puncture member 13 can also be solid throughout and act as a guidewire. In some embodiments, the puncture member 13 can have a removable protective covering at a distal end around the coiled portion 32 when the puncture member 13 also acts as a guidewire.

In some embodiments, the puncture member 13 can be laser cut from a standard hypotube. In some embodiments, the puncture member 13 can be machined using traditional machining methods. In some embodiments, the puncture member 13 can be laser ablated with advanced laser machining methods. In some embodiments, the puncture member 13 can be wire formed from straight wire or ribbon. In other embodiments, the puncture member 13 can be wire formed from tapered wire or ribbon.

2. Tapered Puncture Member

FIGS. 11-29 show another aspect of a transseptal puncture device 200 including various embodiments of a puncture member configured to be tapered. Any embodiments of the transseptal puncture device 200 shown or described below can have any of the components, features, or other details of any other transseptal puncture device embodiments disclosed herein, including without limitation any of the embodiments of the transseptal puncture device described above in any combination with any of the components, features, or details of the transseptal puncture device 200 described below. Similarly, any components, features, or other details of any of the other transseptal puncture device disclosed herein can have any of the components, features, or other details of any embodiments of the transseptal puncture device 200 described below, in any combination, with any of the components, features, or details of the transseptal puncture device embodiments disclosed herein.

One major challenge with some embodiments of a puncture member 13 having a coiled portion 32 mated to a body portion 36 is with the transition where the coiled portion 32 meets the body portion 36 (i.e., the portion that does not have a helical groove). The transition can be a pinch-point and may, in some embodiments, catch on the hole 11 created by the coiled portion 32 as the coiled portion 32 abruptly transitions to a body portion 36 that can be round and larger than the coiled portion 32 (e.g., can be larger than a width of the coil).

Figure 11:
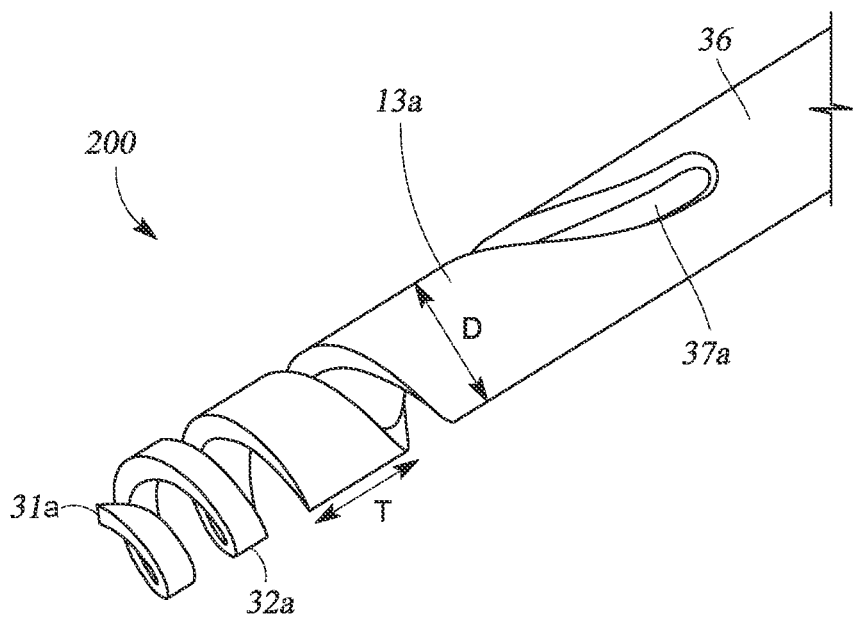
FIG. 11 is a perspective view of an embodiment of a transseptal puncture device.

In some embodiments, a puncture member 13a can include a coiled portion 32a that tapers into the body portion 36, wherein the thickness T of each helical turn of the coiled portion 32a in an axial direction, parallel with a length of the device, increases as the each helical turn gets closer to the body portion 36, such as shown in FIG. 11. In some embodiments, the coiled portion 32a can be tapered such that an angle of the groove at the proximal portion 37a relative to a plane that is perpendicular (referred to herein as a perpendicular plane) to a longitudinally extending centerline axis of the coiled portion 32a is greater than an angle of the groove relative to a perpendicular plane at the distal tip 31a.

In some embodiments, for example and with reference to FIG. 11, a distal groove portion between the adjacent helical turns in a distal portion of the of the coiled portion 32a can be at an acute angle (e.g., without limitation, less than 10 or approximately 10 degrees, less than 15 or approximately 15 degrees, or less than 20 or approximately 20 degrees, or from 5 or approximately 5 degrees to 30 or approximately 30 degrees) relative to a perpendicular plane. In some embodiments, a proximal groove portion can be parallel or approximately parallel with the axial centerline of the coiled portion (i.e., can be perpendicular or at a large angle relative to a perpendicular plane).

In some embodiments, the groove between the adjacent helical turns in a distal portion of the tapered coiled portion 32a can be non-parallel to the groove at the proximal portion 37a of the tapered coiled portion 32a. In other embodiments, the groove between adjacent helical turns at the distal tip 31a of the tapered coiled portion 32a can be perpendicular to the groove at the proximal portion 37a of the tapered coiled portion 32a. In some embodiments, the gap of the puncture member can have a transitional gap portion between the proximal gap portion and the distal gap portion, wherein the transitional gap portion has an angle that is between the angle of the proximal gap portion and the distal gap portion. The tapered coiled portion 32a can, in some embodiments, be made by laser cutting the puncture member 13a from a standard hypotube and tapering the coiled portion 32a.

In some embodiments, at a point where the thickness T of the coiled portion 32a is equal to the diameter D of the hypotube, the hole 11 through the septum FO can transition from surrounding just the coiled portion 32a to covering or surrounding the outer diameter of the entire body portion 36. In some embodiments, in this arrangement, the transseptal puncture device (including without limitation any embodiments of the transseptal puncture device 100, 200) can glide through the hole 11 with very little axial force using the puncture member 13a and can give the operator significantly greater control over the device in the axial direction to avoid cardiac perforation or other damage. Again, in some embodiments, this can be achieved by progressively stretching the pierced hole 11 and making the hole 11 progressively larger as the puncture member 13a is advanced through the hole 11 by rotating the puncture member 13 until the stretched hole 11 around the puncture member 13a has the same diameter as the diameter D of the body portion 36.

In some embodiments, the groove or cutout of the coiled portion 32a can have a proximal portion 37a (see FIG. 11) that has an orientation that is approximately in alignment with an axial centerline of the transseptal puncture device 200. In some embodiments, the orientation of the proximal portion 37a may be for example and without limitation, parallel with an axial centerline of the transseptal puncture device 200. This can, in some embodiments, inhibit (e.g., prevent) a catch or snag point for the tissue to reduce the risk or prevent a catch point for the tissue.

Figure 12:
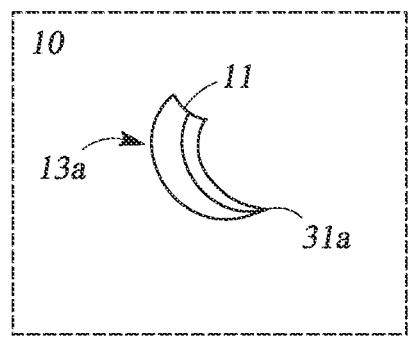
FIG. 12 is a perspective view of the transseptal puncture device from FIG. 11 advancing through a barrier surface, showing a tip of a puncture member advancing.
Figure 13:
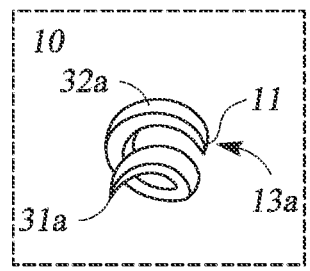
FIG. 13 is a perspective view of the transseptal puncture device from FIG. 11 advancing through a barrier surface, showing a coiled portion of the puncture member.
Figure 14:
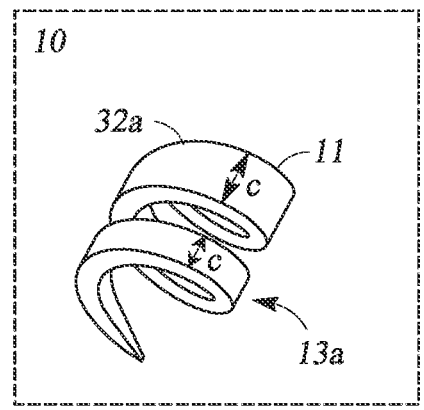
FIG. 14 is a perspective view of the transseptal puncture device from FIG. 11, continuing to advance through the barrier surface.
Figure 15:
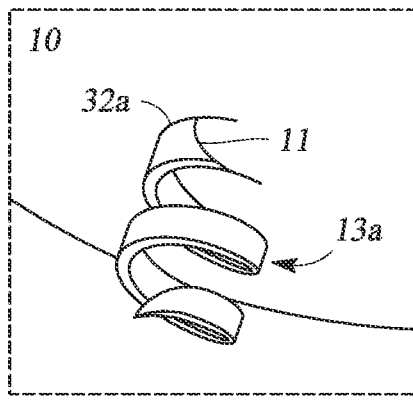
FIG. 15 is a perspective view of the transseptal puncture device from FIG. 11, continuing to advance through the barrier surface.
Figure 16:
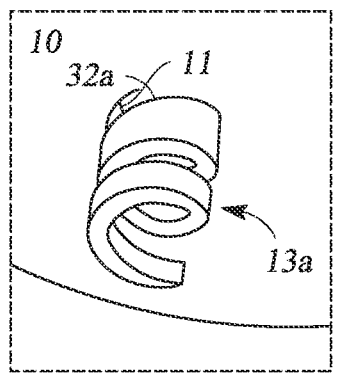
FIG. 16 is a perspective view of the transseptal puncture device from FIG. 11, continuing to advance through the barrier surface.
Figure 17:
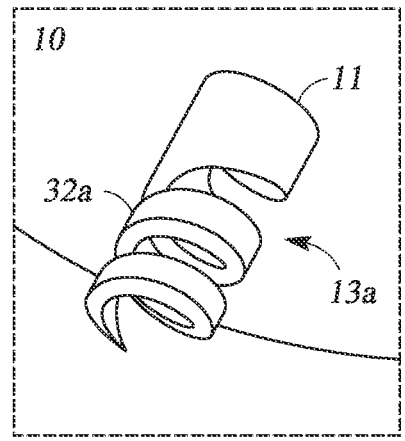
FIG. 17 is a perspective view of the transseptal puncture device from FIG. 11, continuing to advance through the barrier surface.
Figure 18:
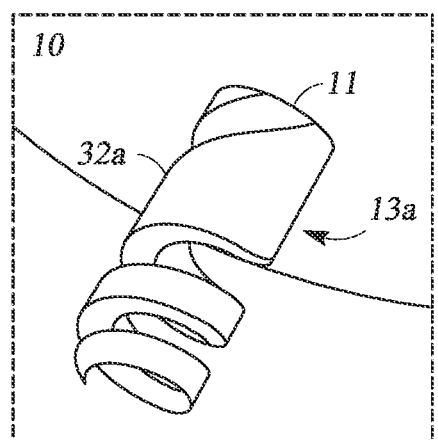
FIG. 18 is a perspective view of the transseptal puncture device from FIG. 11, continuing to advance through the barrier surface.
Figure 19:
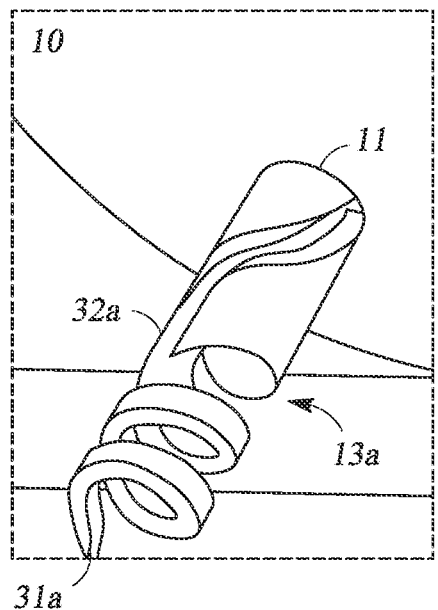
FIG. 19 is a perspective view of the transseptal puncture device from FIG. 11, continuing to advance through the barrier surface.
Figure 20:
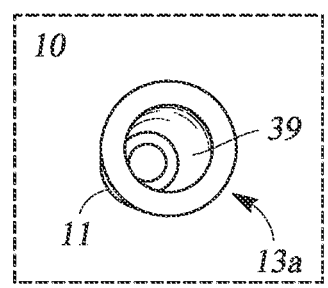
FIG. 20 is a perspective view of the transseptal puncture device from FIG. 11, showing a proximal end of the coiled portion of the puncture member from FIG. 14.
Figure 21:
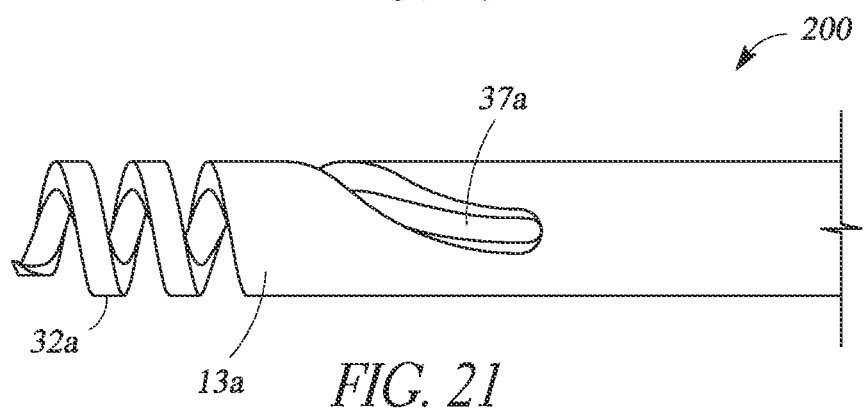
FIG. 21 is a side view of an embodiment of a puncture member.
Figure 22:
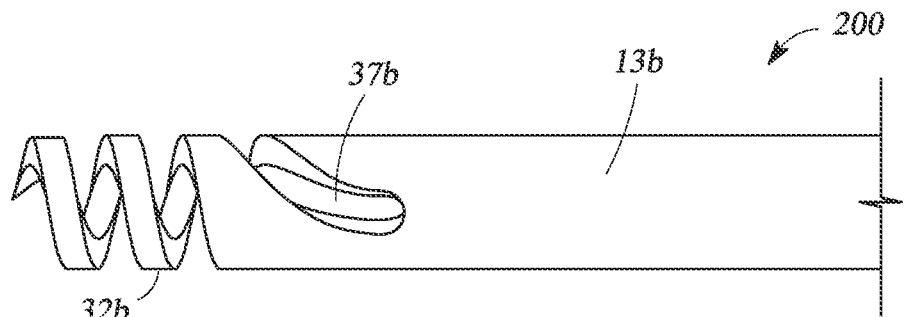
FIG. 22 is a side view of another embodiment of a puncture member.
Figure 23:
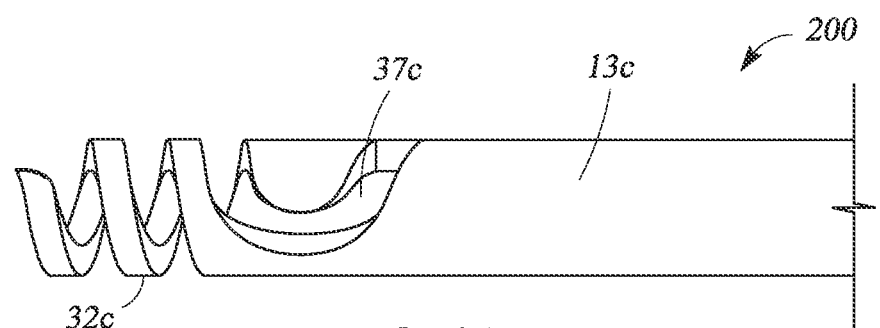
FIG. 23 is a side view of another embodiment of a puncture member.

FIG. 11 shows an embodiment of the puncture member 13a of the transseptal puncture device 200. FIGS. 12-20 show the puncture member 13a as the puncture member is being rotated and advanced through a barrier surface 10 (e.g., septum tissue), illustrating the action of the puncture member 13a as the coiled portion 32a of the puncture member 13a is advanced through the septum FO. In any embodiments disclosed herein, the barrier surface 10 can be the interatrial septum and all instances of the term barrier surface disclosed herein can be used to refer to the interatrial septum. As shown in FIG. 12, a distal tip 31a of a puncture member 13a can first advance through the barrier surface 10. The coiled portion 32a can then be rotated and advanced through the barrier surface 10 as in FIG. 13. As illustrated in FIGS. 14-16, the barrier surface 10 may be stretched to a larger size by the increasing thickness T of the coiled portion 32a. In some embodiments, the transseptal puncture device 200 can cause the tissue to rotate so that an orientation of the hole 11 is at an angle to the tissue surface. In FIG. 17, the hole 11 on the barrier surface 10 has been stretched a sufficient amount (e.g., wherein the diameter of the hole equals to the diameter D of the puncture member 13a) to cause the barrier surface 10 to surround the outside surface of the puncture member 13a. FIGS. 18-19 show the position of the puncture member when the barrier surface 10 is no longer engaged by the groove in the puncture member 13a. Rather, the barrier surface 10 surrounds an outside surface of the puncture member 13a. The puncture member 13a or other components of the transseptal puncture device 200 (e.g., the dilator) can be axially advanced through the hole 11 on the barrier surface 10 without the need of a twisting action. As illustrated in FIG. 20, when the puncture member 13a is advanced through the hole 11 on the barrier surface 10, other components of the transseptal puncture device 200 or another device may be advance through the hole 11 though a lumen 39 of the puncture member 13a.

FIGS. 21-26 illustrate various embodiments of puncture members 13a-13e that have coiled portions 32a-32e with different pitches, different angles, and different shapes. For example, a puncture member 13b can include a proximal portion 37b of the coiled portion 32a that is shorter than the proximal portion 37a. In some embodiments, a puncture member 13c can include a proximal portion 37c of the coiled portion 32a that is curved to potentially reduce the risk for the tissue to be caught onto the proximal portion 37c. In other embodiments, with reference to FIG. 24, the proximal portion 37d of the coiled portion 32d can be short. For example and without limitation, the proximal portion 37d of the groove can have a length that is the same as, approximately the same as, or shorter than a width of the gap.

Figure 24:
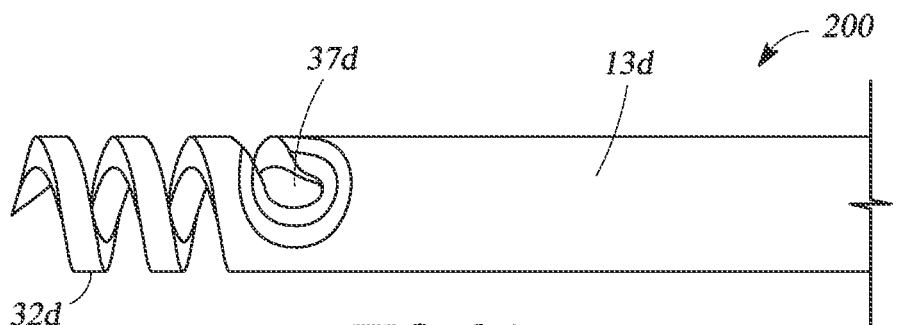
FIG. 24 is a side view of another embodiment of a puncture member.

In any embodiments, the proximal portion of the gap (i.e., the portion of the gap that is at a proximal end portion of the coiled portion), which can be straight or generally straight and aligned with an axial centerline of the coiled portion, can have a length that is the same as or approximately the same as a width of the gap in the proximal portion of the gap, or that is less than a width of the gap. In other embodiments, the proximal portion of the gap (i.e., the portion of the gap that is at a proximal end portion of the coiled portion), which can be straight or generally straight and aligned with an axial centerline of the coiled portion, can have a length that is longer than a width of the gap, including having a length that is twice as long as the width of the gap in the proximal portion of the gap, or 2.5 times the width of the gap or more than 2.5 times the width of the gap, or from 2 times or less than 2 times to 5 times or more than 5 times the width of the gap in the proximal portion of the gap. Any of the embodiments disclosed herein can have a cutting edge formed on or at a proximal end of the gap, for example as shown in FIG. 24.

Figure 25:
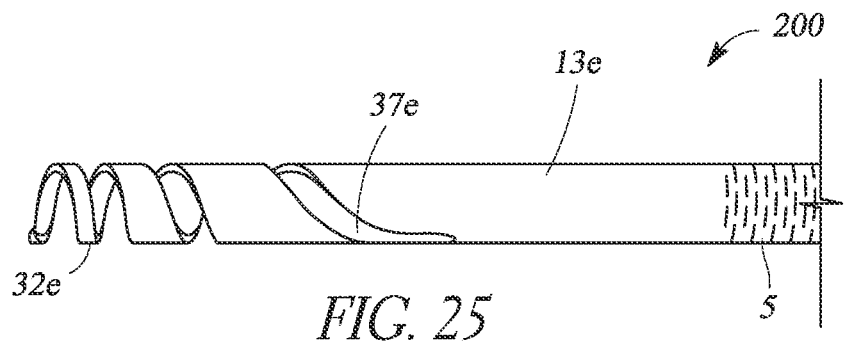
FIG. 25 is a side view of another embodiment of a puncture member.
Figure 26:
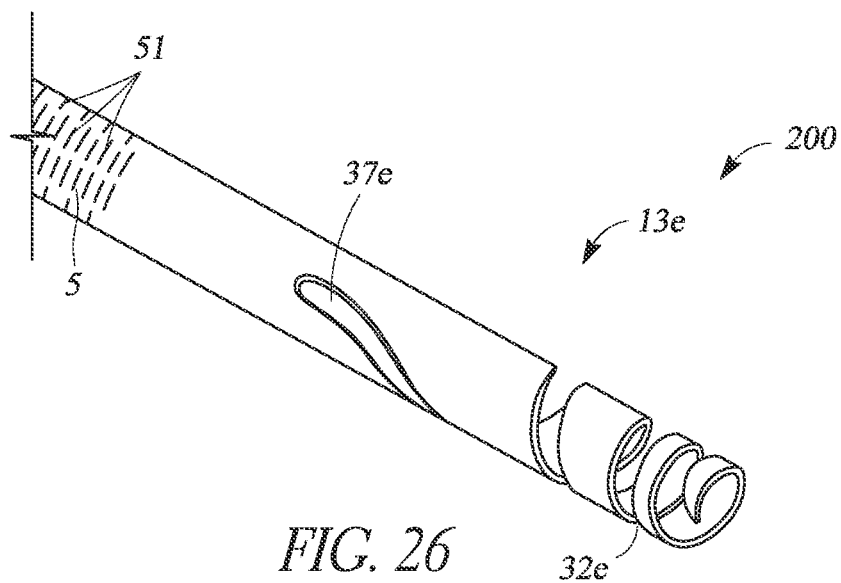
FIG. 26 is a perspective view of the puncture member from FIG. 25.

FIGS. 25-26 show an embodiment of a tapered puncture member 13e attached to a flexible proximal body portion 5 (that can be formed from a hypotube). In some embodiments, the flexible proximal hypotube can include laser cut cutouts 51 configured to allow the body portion of the puncture member to bend and flex. Various embodiments of puncture members disclosed herein can be laser cut from a standard hypotube and can be made from stainless steel, Nitinol, or any other desired material.

Figure 27:
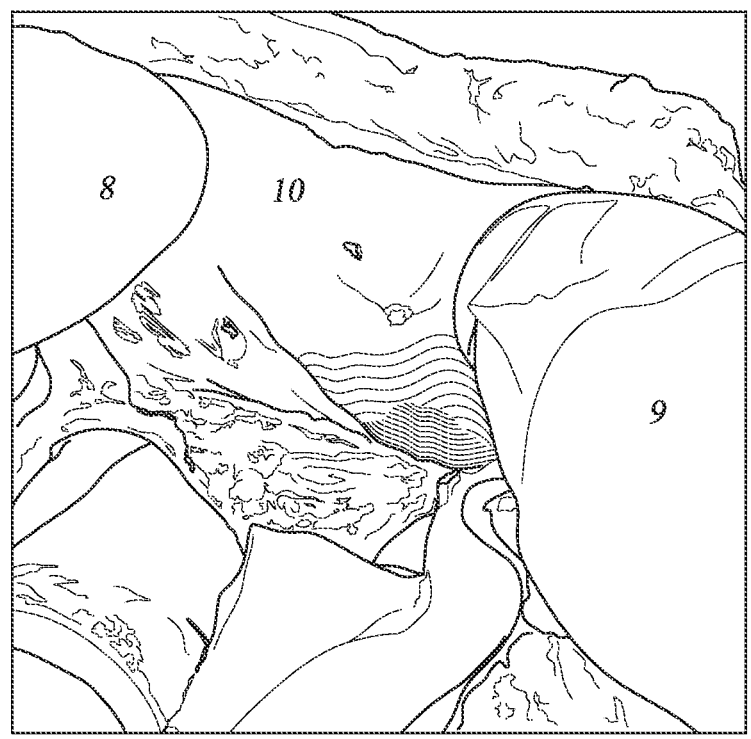
FIG. 27 illustrates a barrier surface and the puncture member from FIG. 25 pressed against the barrier surface from a back side.
Figure 28:
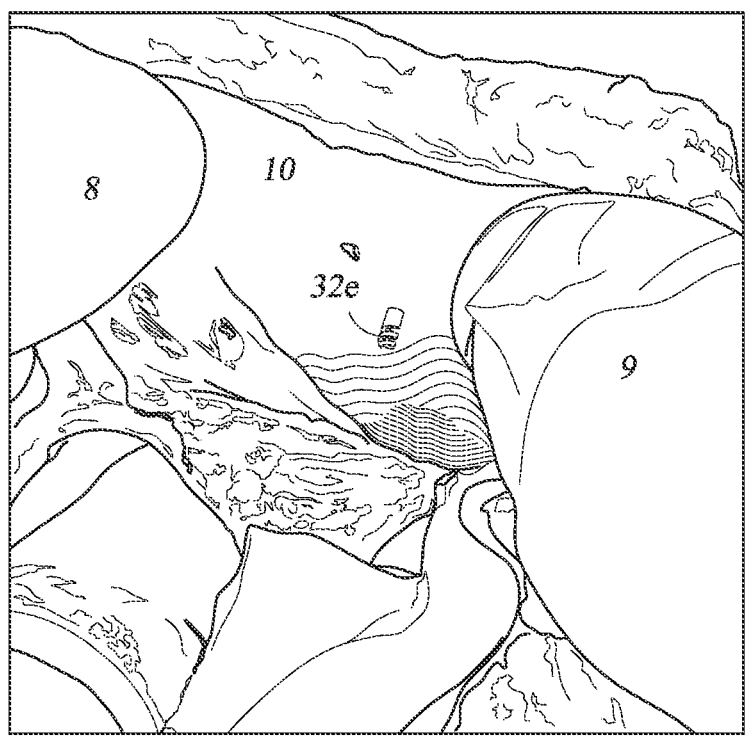
FIG. 28 illustrates the barrier surface and the puncture member from FIG. 27, showing the puncture member advancing through the barrier surface.
Figure 29:
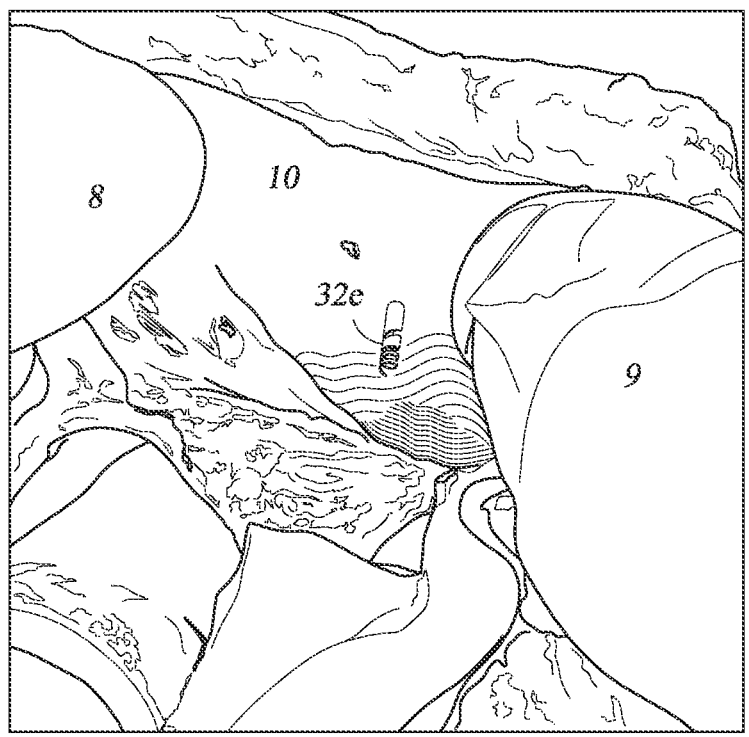
FIG. 29 illustrates the barrier surface and the puncture member from FIG. 27, showing the puncture member continuing to advance through the barrier surface.

FIGS. 27-29 show the tapered puncture member 13e crossing a representative barrier surface 10 held by fingers 8 and 9. FIG. 27 illustrates the tapered puncture member 13e being pressed against the barrier surface 10 from a back side. In FIGS. 28-29, the tapered puncture member 13e can be advanced through the barrier surface 10, showing the coiled portion 32e advancing from behind the barrier surface 10.

3. Puncture Member with Transition Cutter

One major challenge with a puncture member is the transition between a coiled portion and a body portion (e.g., a hypotube) when the two are mated to form the puncture member. In some embodiments, where the coiled portion meets or couples with the body portion, there can be a pinch-point that can catch the tissue surrounding the small hole created by the puncture member as the coiled portion of the puncture member transitions to a large and round body portion. In some embodiments, the transseptal puncture device 300 can include a beveled or sharpened edge (e.g., created by grinding an edge on the puncture member) at the transition point between a coiled portion and a body portion of a puncture member. Once the surface of the tissue reaches the sharpened transition, the tissue may be pulled into the sharpened transition through torque and be cut through. In this manner, the puncture member can act as a cut, not a hole punch, so as to not create any detached tissue that could present other risks. Some variations of a seam ripper used for stitching and sewing use a similar feature.

Any embodiments of the transseptal puncture device 300 shown or described below can have any of the components, features, or other details of any other transseptal puncture device embodiments disclosed herein, including without limitation any of the embodiments of the transseptal puncture device described above in any combination with any of the components, features, or details of the transseptal puncture device 300 described below. Similarly, any components, features, or other details of any of the other transseptal puncture device disclosed herein can have any of the components, features, or other details of any embodiments of the transseptal puncture device 300 described below, in any combination, with any of the components, features, or details of the transseptal puncture device embodiments disclosed herein.

Figure 30:
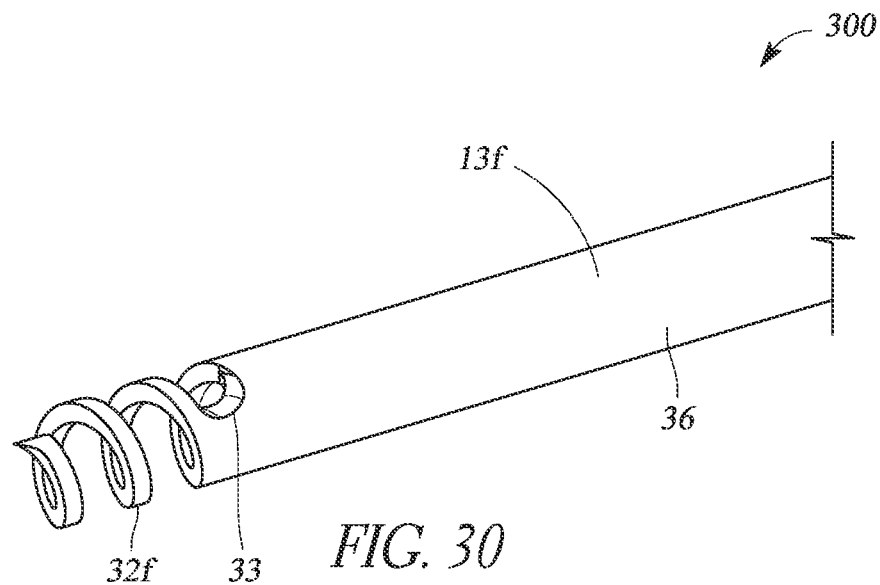
FIG. 30 is a perspective view of an embodiment of a puncture member with a sharpened transition.
Figure 31:
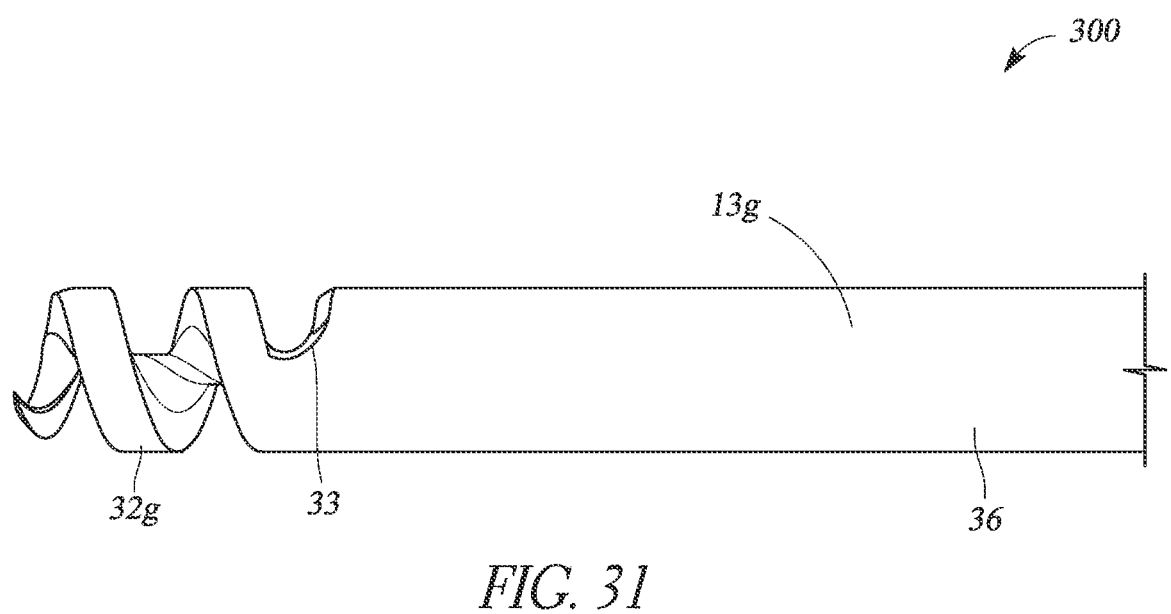
FIG. 31 is a side view of another embodiment of a puncture member with a sharpened transition.
Figure 32:
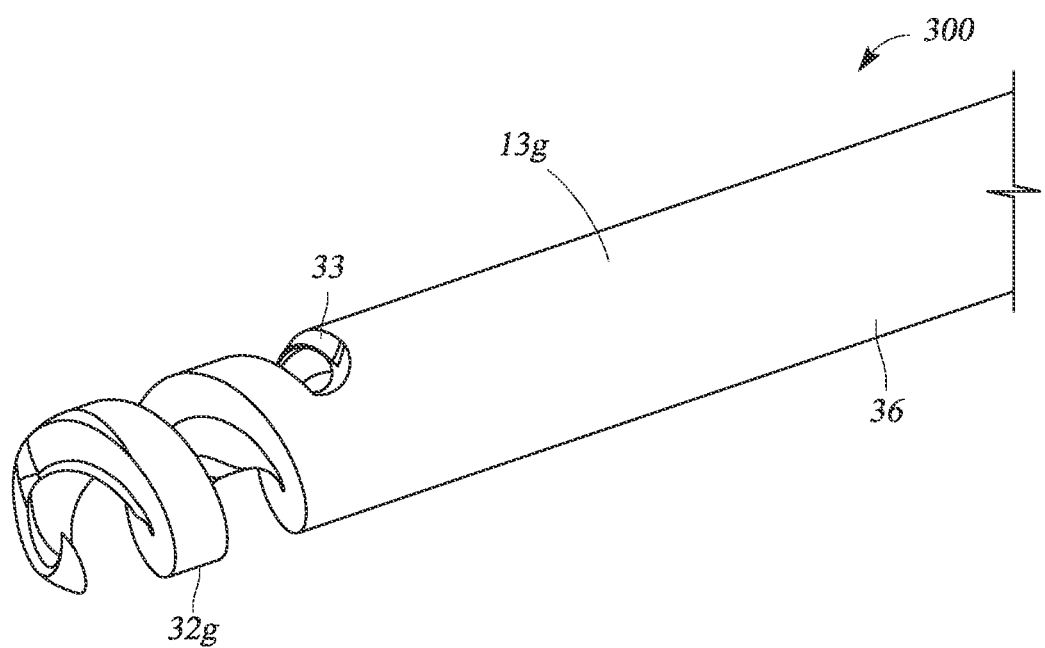
FIG. 32 is a perspective view of the puncture member from FIG. 31.

FIG. 30 shows an embodiment of a puncture member 13*f* of a transseptal puncture device 300 having a sharpened interface 33 at the transition of the coiled portion 32*f* to the body portion 36 (which can be solid and/or grooveless). In some embodiments, the sharpened interface 33 can include a sharpened outer edge configured to cut through tissue. Similarly, FIGS. 31-32 show another embodiment of a puncture member 13*g* having a sharpened interface 33 at the transition of the coiled portion 32*g* to the body portion 36.

4. Gripper with Needle

Described below are additional embodiments of a transseptal puncture device 400. Any embodiments of the transseptal puncture device 400 shown or described below can have any of the components, features, or other details of any other transseptal puncture device embodiments disclosed herein, including without limitation any of the embodiments of the transseptal puncture device described above in any combination with any of the components, features, or details of the transseptal puncture device 400 described below. Similarly, any components, features, or other details of any of the other transseptal puncture device disclosed herein can have any of the components, features, or other details of any embodiments of the transseptal puncture device 400 described below, in any combination, with any of the components, features, or details of the transseptal puncture device embodiments disclosed herein.

One challenge with a traditional mechanical needle is the forward axial pressure required to puncture a challenging septum may cause excessive "tenting" of the tissue such that the operator would be concerned of unexpected sudden forward movement of the needle once the needle pops through the tissue, which could damage to other cardiac tissues. Some embodiments of the puncture member disclosed herein may be configured to grip and hold the tissue for a traditional needle to follow from within the puncture member, thus almost eliminating any unexpected tenting of the tissue and risk of damage to other cardiac tissues.

Figure 33:
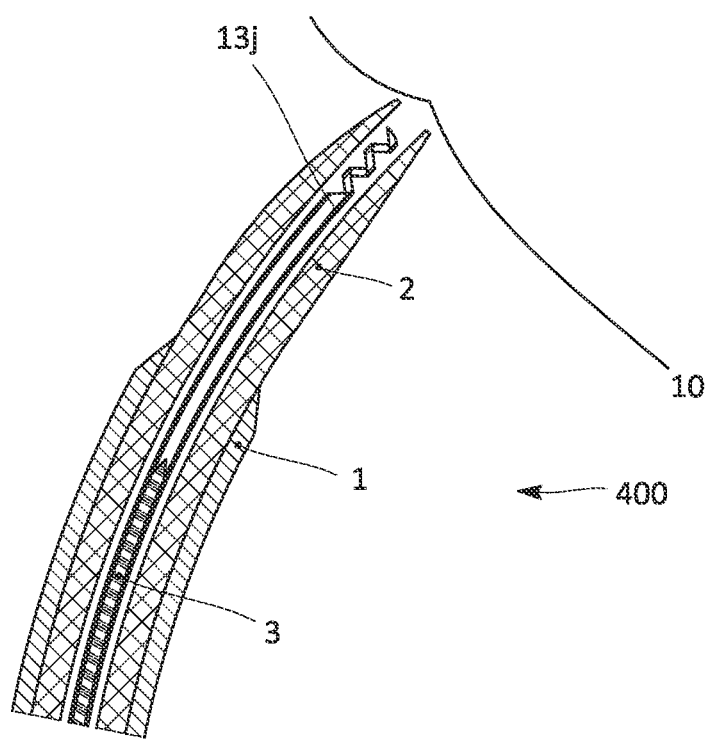
FIG. 33 is a section view of an embodiment of a transseptal puncture device with a puncture member from FIG. 31 advancing toward a barrier surface.

During an exemplary transseptal puncture procedure, the dilator 2 of a transseptal puncture device 400 can be used in some embodiments to apply a slight axial forward pressure to the barrier surface 10 to "tent" the barrier surface 10 as a means to determine an appropriate location for crossing use fluoroscopy and echo, as shown in FIG. 33. The transseptal puncture device 400 can include a puncture member 13*j* configured to act as a gripper and be recessed in the dilator until later advanced for use (see FIG. 33).

Figure 34:
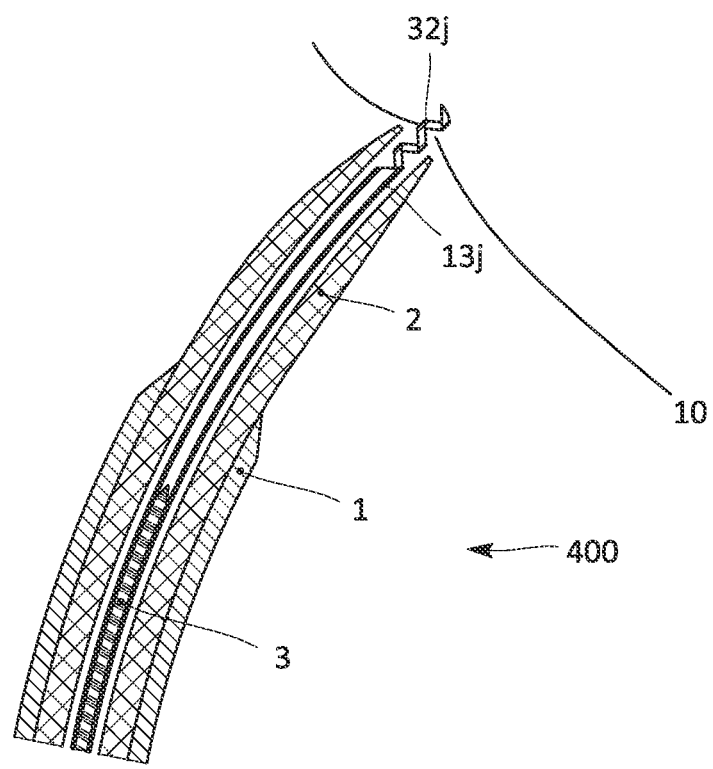
FIG. 34 is a section view of the transseptal puncture device, showing the puncture member gripper advancing through the barrier surface.
Figure 35:
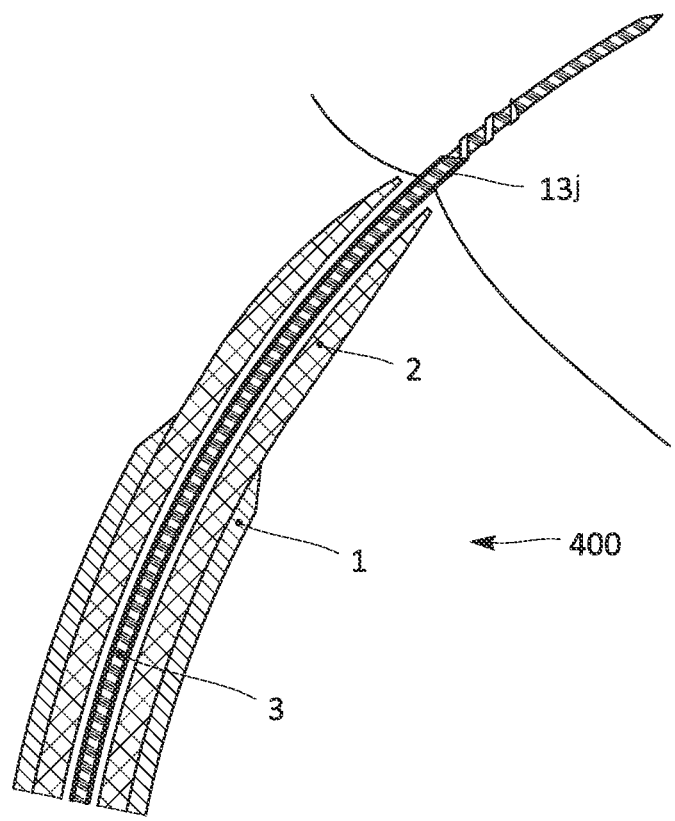
FIG. 35 is a section view of the transseptal puncture device, showing a needle advancing through the barrier surface.

The puncture member 13*j* can be advanced to the barrier surface 10 and then rotated, which can pierce the barrier surface 10 and drive the coil into and across the barrier surface 10. In some embodiments, the coiled portion 32*j* of the puncture member 13*j* can hold the barrier surface 10 for puncture with a needle 3 as illustrated in FIG. 34. The needle 3 can then be advanced through the puncture member 13*j* to pierce and cross the barrier surface 10 with very little tenting, or significantly less tenting as compared to traditional methods, as shown in FIG. 35. Standard crossing procedure may follow.

Figure 36:
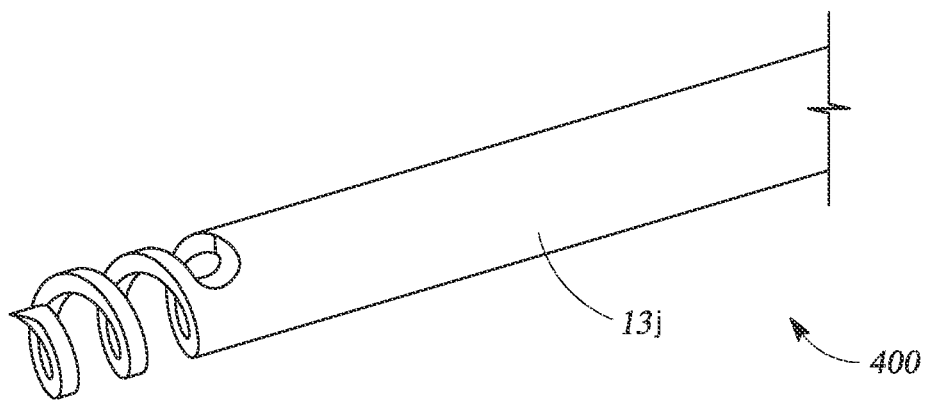
FIG. 36 is a perspective view of a puncture member gripper.
Figure 37:
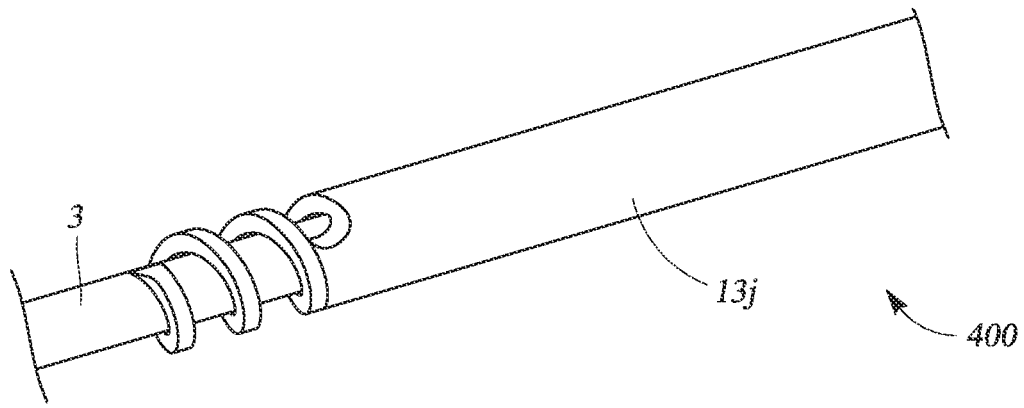
FIG. 37 is a perspective view of the puncture member gripper from FIG. 36 with a needle extending through the puncture member gripper.

Any embodiments of the transseptal puncture devices (e.g., coil hypotube, coil hypotube gripper, etc.) disclosed herein can be laser cut from a standard hypotube. As shown in FIGS. 36-37, the transition from the coiled portion 32*j* to the body portion 36 for a puncture member 13*j* may be abrupt, since there is little or no transition in the coil or stretching of the tissue as the transseptal puncture device is advanced through the tissue. In some embodiments, the coiled portion 32*j* of this embodiment can be used to hold the tissue as a needle 3 is advanced through a lumen of the puncture member 13*j* to puncture the septum.

Figure 38:
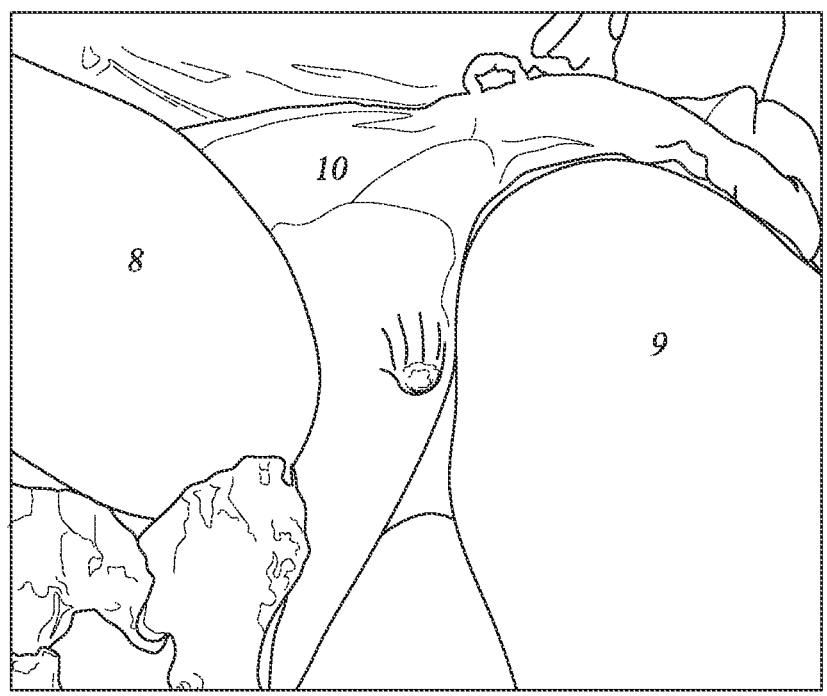
FIG. 38 illustrates a barrier surface and a puncture member gripper pressed against the barrier surface from a back side.
Figure 39:
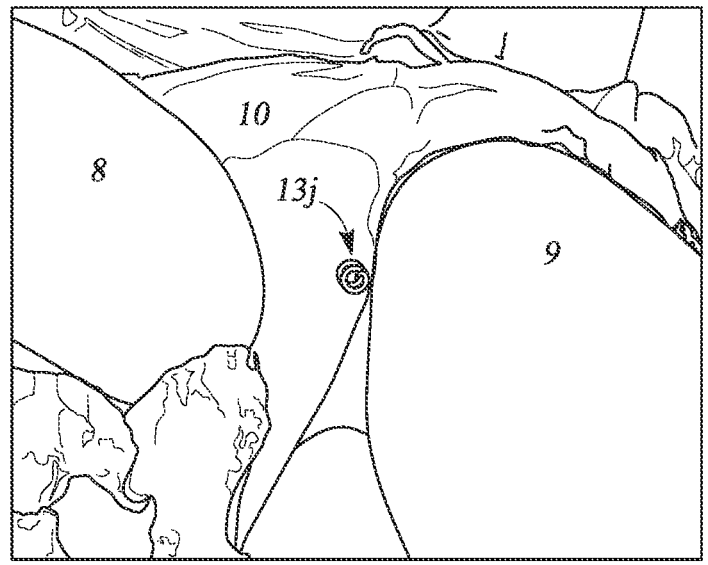
FIG. 39 illustrates the barrier surface and the puncture member from FIG. 38, showing the puncture member advancing through the barrier surface.
Figure 40:
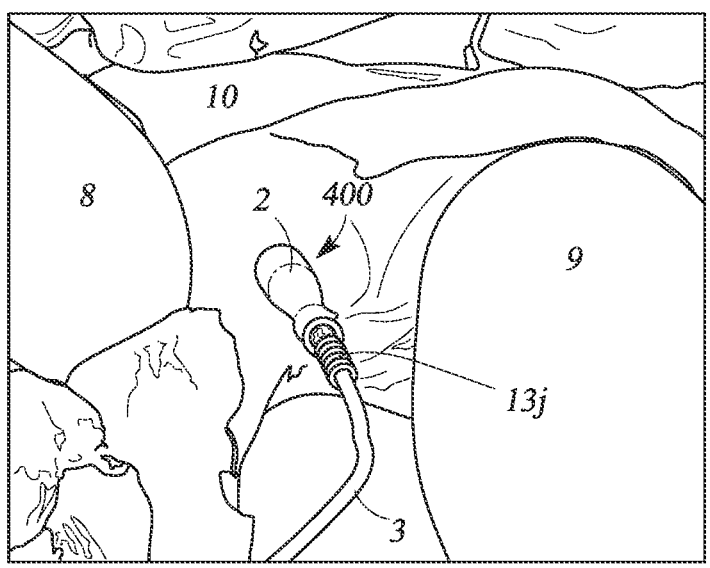
FIG. 40 illustrates the barrier surface and the puncture member from FIG. 38, showing a wire and a sheath advancing through the barrier surface.

FIGS. 38-40 illustrates an embodiment of a transseptal puncture device 400 including a puncture member 13*j* being used to create a puncture through the barrier surface 10 held by fingers 8 and 9. As illustrated in FIG. 39, the barrier surface 10 may be pressed upon by the transceptal puncture device from a back side. FIG. 40 shows that the coiled portion 32*j* of the puncture member 13*j* may be advanced through the barrier surface 10 and may hold the tissue for advancing with a needle 3 as described above. Further, FIG. 40 shows the needle 3 pierced through the barrier surface 10, and the dilator 2 may also follow and advance through the barrier surface 10.

5. Puncture Member with Helical Guard

Described below are additional embodiments of a transseptal puncture device 500. Any embodiments of the transseptal puncture device 500 shown or described below can have any of the components, features, or other details of any other transseptal puncture device embodiments disclosed herein, including without limitation any of the embodiments of the transseptal puncture device described above in any combination with any of the components, features, or details of the transseptal puncture device 500 described below. Similarly, any components, features, or other details of any of the other transseptal puncture device disclosed herein can have any of the components, features, or other details of any embodiments of the transseptal puncture device 500 described below, in any combination, with any of the components, features, or details of the transseptal puncture device embodiments disclosed herein.

Some embodiments disclosed herein include using the standard dilator and sheath with a novel atraumatic crossing guidewire which can both cross the tissue and be atraumatic, instead of a standard mechanical needle (which may present some challenges). FIGS. 41-46 shows exemplary embodiments of a novel crossing guidewire with helical guard configures to be atraumatic.

Figure 41:
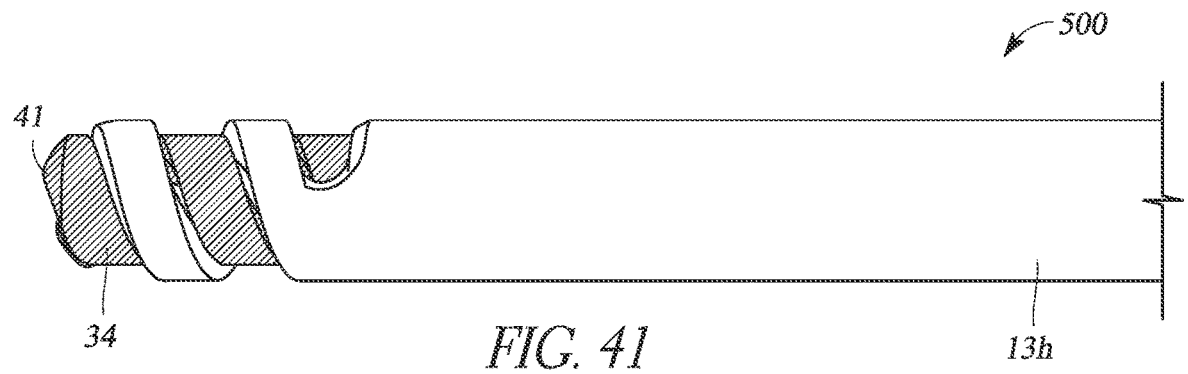
FIG. 41 is a side view of an embodiment of a crossing guidewire with helical guard.
Figure 42:
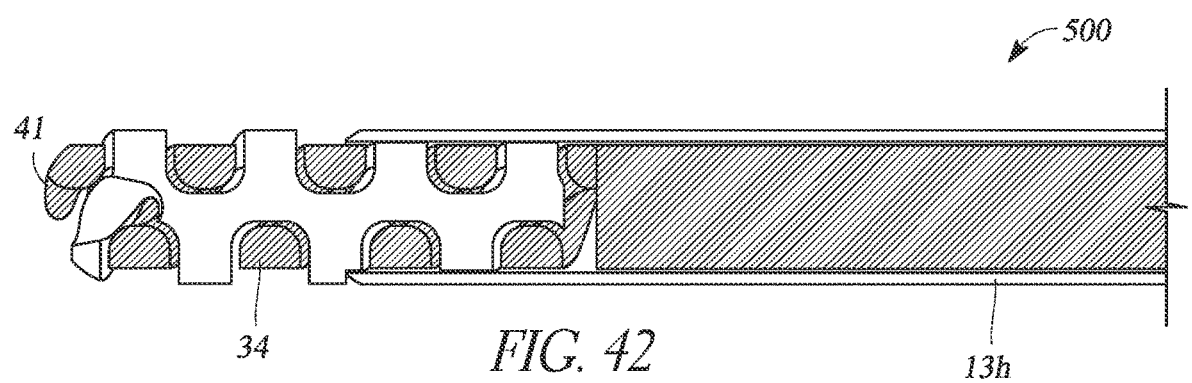
FIG. 42 is a section view of the crossing guidewire with helical guard from FIG. 41, through an axial centerline.
Figure 43:
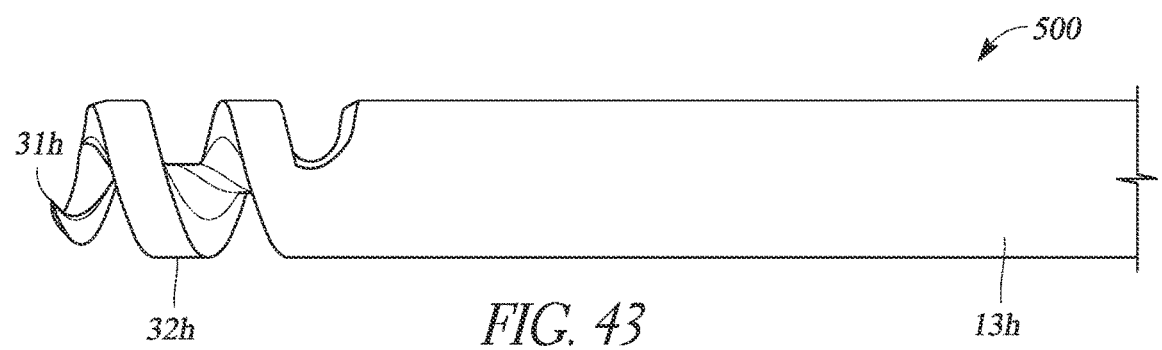
FIG. 43 is a side view of the crossing guidewire with helical guard from FIG. 41 with the helical guard retracted.
Figure 44:
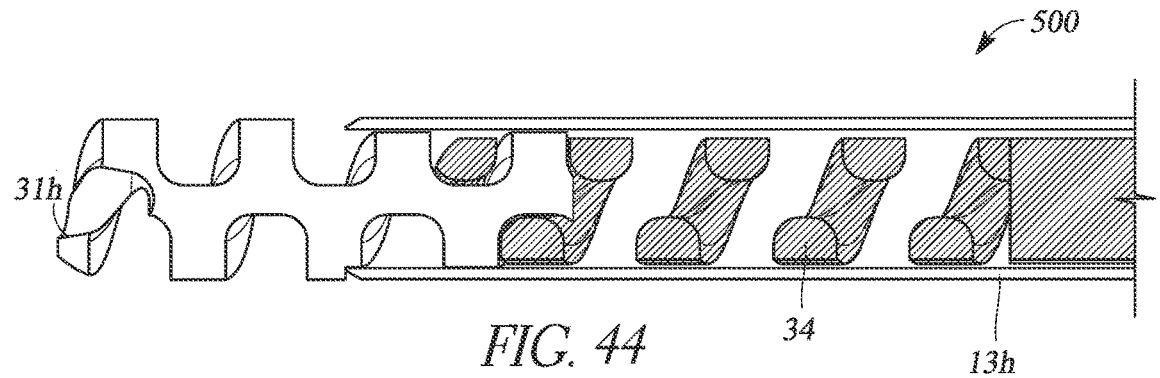
FIG. 44 is a section view of the crossing guidewire with helical guard from FIG. 43, through an axial centerline.
Figure 45:
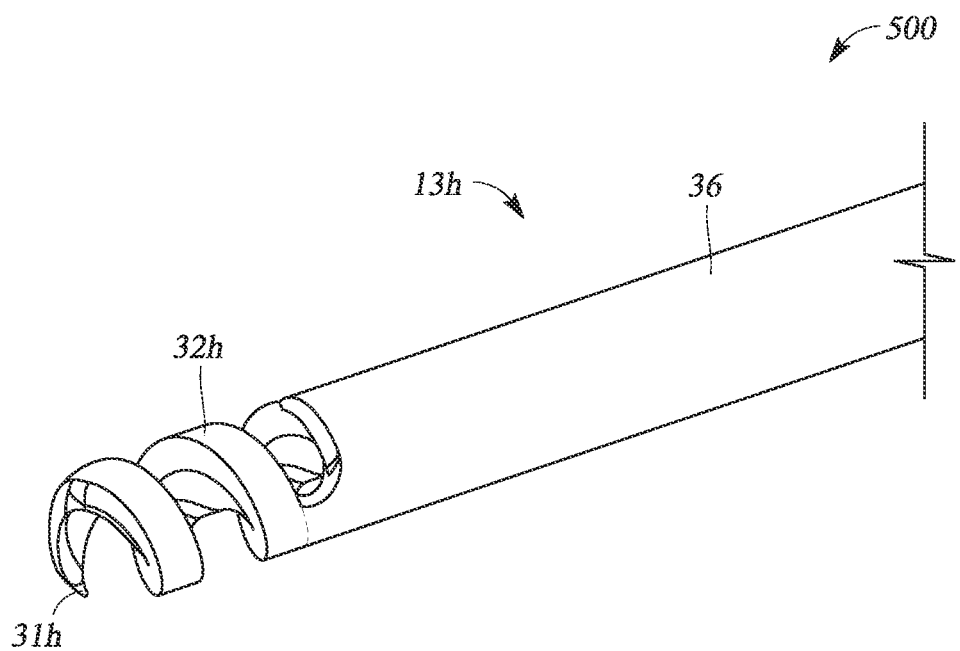
FIG. 45 is a perspective view of the crossing guidewire from FIG. 41 without the helical guard.
Figure 46:
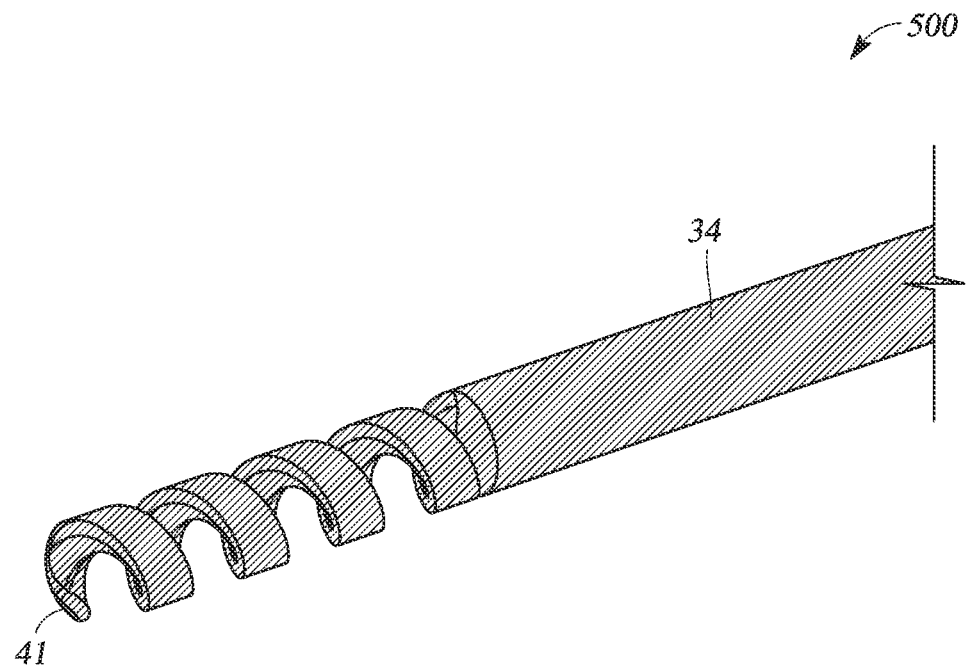
FIG. 46 is a perspective view of the helical guard from FIG. 41 without the crossing guidewire.

One variation of the transseptal puncture device 500 disclosed herein can include a puncture member 13*h* having an auger-like corkscrew coiled portion 32*h* with a sharp distal tip 31*h*. The coiled portion 32*h* can be connected to a body portion 36 (e.g., a flexible hypotube) as shown in FIG. 45. The puncture member 13*h* can include a helical rounded guard 34 positioned inside of the puncture member 13*h*. In some embodiments, the puncture member 13*h* can have a 0.035" diameter to fit a guard inside. In some embodiments, the puncture member 13*h* can be configured to cross the septum when the helical rounded guard 34 is retracted proximally as shown in FIGS. 43 and 44. In some embodiments, the helical rounded guard 34, when distally advanced, can prevent the sharp distal tip 31*h* from contacting and piercing the tissue as shown in FIGS. 41 and 42. The helical rounded guard 34 can include a relatively round tip 41 (see FIG. 47) configured to make atraumatic contact with a tissue, enabling the puncture member 13h to atraumatically guide the dilator and sheath with the helical rounded guard 34 advanced.

6. Crossing Guidewire with Guard (General)

Described below are additional embodiments of a transseptal puncture device 600. Any embodiments of the transseptal puncture device 600 shown or described below can have any of the components, features, or other details of any other transseptal puncture device embodiments disclosed herein, including without limitation any of the embodiments of the transseptal puncture device described above in any combination with any of the components, features, or details of the transseptal puncture device 600 described below. Similarly, any components, features, or other details of any of the other transseptal puncture device disclosed herein can have any of the components, features, or other details of any embodiments of the transseptal puncture device 600 described below, in any combination, with any of the components, features, or details of the transseptal puncture device embodiments disclosed herein.

As discussed above, some aspect of this disclosure is to use the standard dilator and sheath with a novel crossing guidewire which can both cross and be atraumatic, instead of a mechanical needle. Alternate variations for an atraumatic crossing guidewire with guard are shown and described below.

Figure 47:
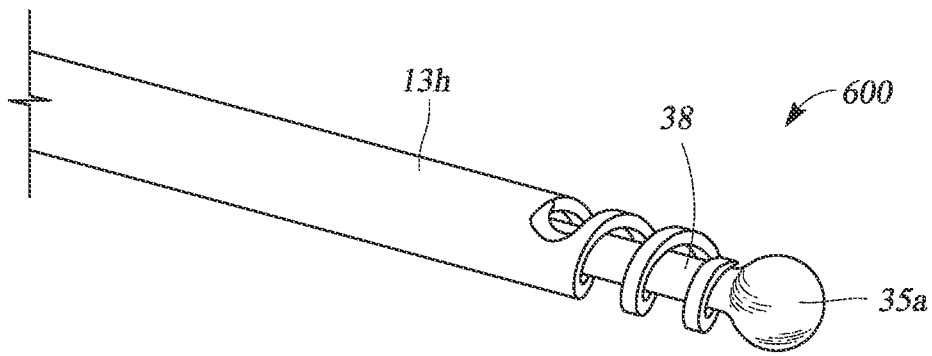
FIG. 47 is a perspective view of an embodiments of a distal coil guard inside a crossing guidewire.

FIG. 47 shows an embodiment of the transseptal puncture device 600 including a crossing guidewire 38 with a distal coil guard 35 at a distal end of the crossing guidewire 38, the crossing guidewire 38 inserted through the puncture member 13h. In some embodiments, the distal coil guard 35a can be a balloon or soft expandable polymer to allow the distal coil guard 35a to be pulled into the puncture member 13h for piercing and re-advanced back out for protection of the tissue.

Figure 48:
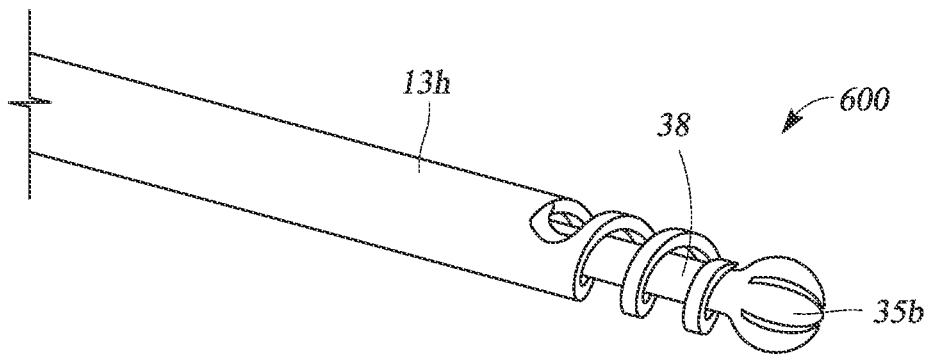
FIG. 48 is a perspective view of another embodiments of a distal coil guard inside a crossing guidewire.

FIG. 48 shows an embodiment of the crossing guidewire 38 with a distal coil guard 35b inserted through the puncture member 13h. In some embodiments, the distal coil guard 35b can be a laser-cut expanded tube formed into an atraumatic tip. In some embodiments, the distal coil guard 35b can be made from a material such as nitinol, polymer, or stainless steel with a cut pattern design to allow the distal coil guard 35b to be pulled into the coil for piercing and re-advanced back out for protection.

Figure 49:
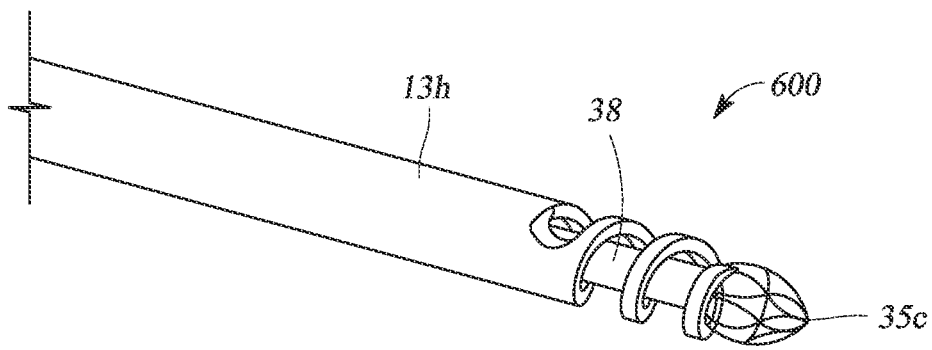
FIG. 49 is a perspective view of another embodiments of a distal coil guard inside a crossing guidewire.

FIG. 49 shows an embodiment of the crossing guidewire 38 with a distal coil guard 35c inserted through the puncture member 13h. In some embodiments, the distal coil guard 35c can be laser cut and shapeset, or wireformed to form an expandable ball at the distal end of the tip. In some embodiments, the distal coil guard 35 can be made from a material such as nitinol, polymer, or stainless steel with a pattern design to allow it to be pulled into the coil for piercing and re-advanced back out for protection.

Figure 50:
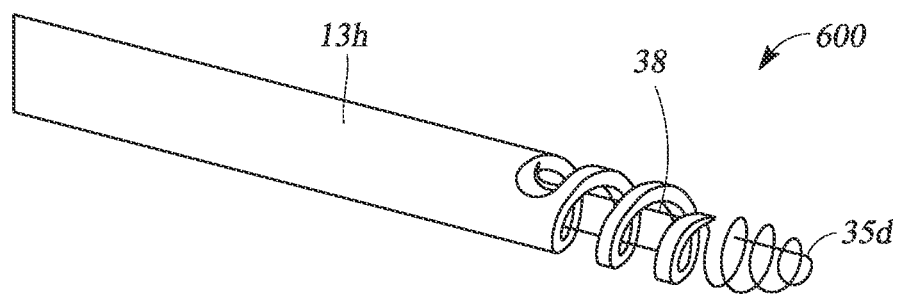
FIG. 50 is a perspective view of another embodiments of a distal coil guard inside a crossing guidewire.

FIG. 50 shows an embodiment of the crossing guidewire 38 with a distal coil guard 35d inserted through the puncture member 13h. In some embodiments, the distal coil guard 35d can be formed of a single wire, creating an expandable ball at the distal end of the tip. In some embodiments, the distal coil guard 35d can be made of materials such as nitinol, polymer, or stainless steel with a pattern design to allow it to be pulled into the coil for piercing and re-advanced back out for protection.

Figure 51:
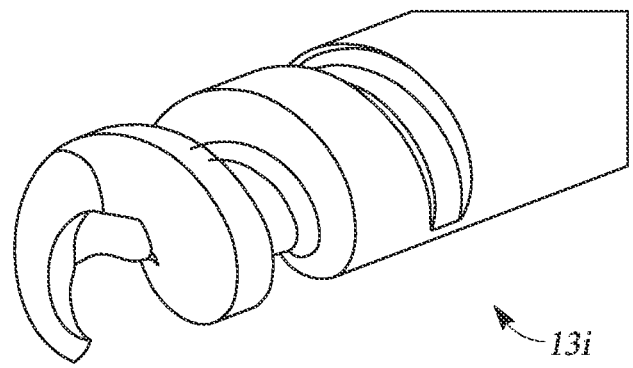
FIG. 51 is a perspective view of an embodiment of a solid core coil.
Figure 52:
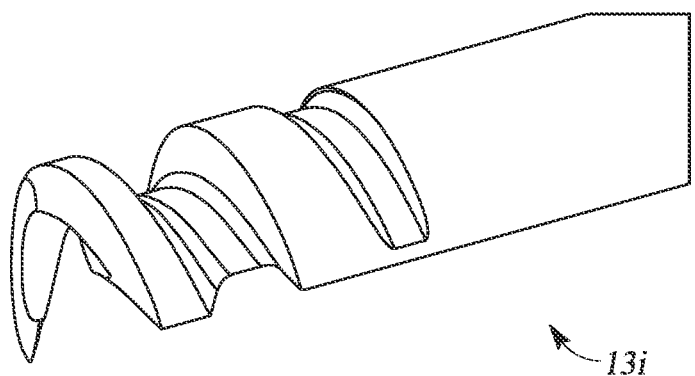
FIG. 52 is another perspective view of the solid core coil from FIG. 51.

Alternatively, the transseptal puncture device 600 disclosed herein can also include a puncture member 13i in the form of a solid core coil (screw-like) without guard as shown in FIGS. 51 and 52. This embodiment can be used for crossing when the design is control with low septal wall tenting. An inner diameter of the puncture member 13i can increase to gradually make the size of the hole 11 larger.

7. Shaped Cutting Wire (Needle) with Rotation/Oscillation

Described below are additional embodiments of a transseptal puncture device 700. Any embodiments of the transseptal puncture device 700 shown or described below can have any of the components, features, or other details of any other transseptal puncture device embodiments disclosed herein, including without limitation any of the embodiments of the transseptal puncture device described above in any combination with any of the components, features, or details of the transseptal puncture device 700 described below. Similarly, any components, features, or other details of any of the other transseptal puncture device disclosed herein can have any of the components, features, or other details of any embodiments of the transseptal puncture device 700 described below, in any combination, with any of the components, features, or details of the transseptal puncture device embodiments disclosed herein.

Rather than applying a significant forward axial pressure to the septum (or FO) with a needle, the following device and method embodiments may apply a slight axial pressure because rotation or oscillation motion is added to significantly reduce the axial pressure used to cross the tissue.

Figure 53:
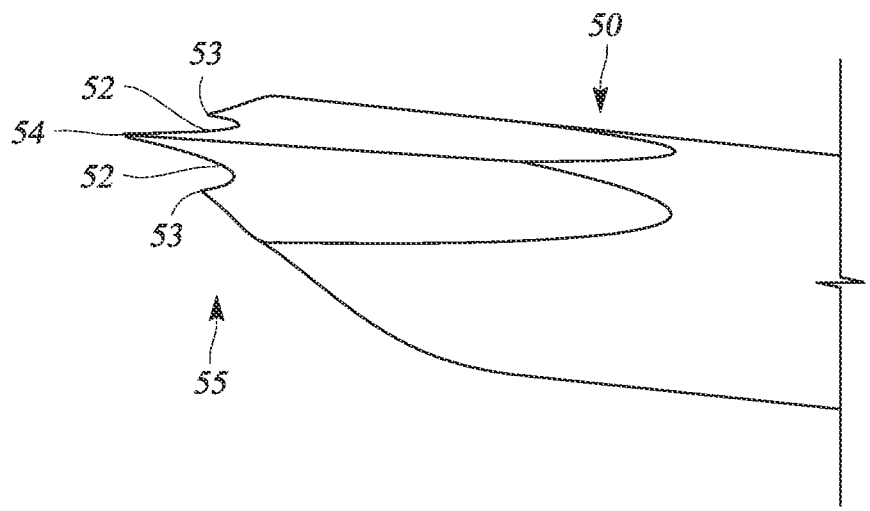
FIG. 53 is a perspective view of an embodiment of a shaped cutting wire with a saw-tooth-like tip.
Figure 54:
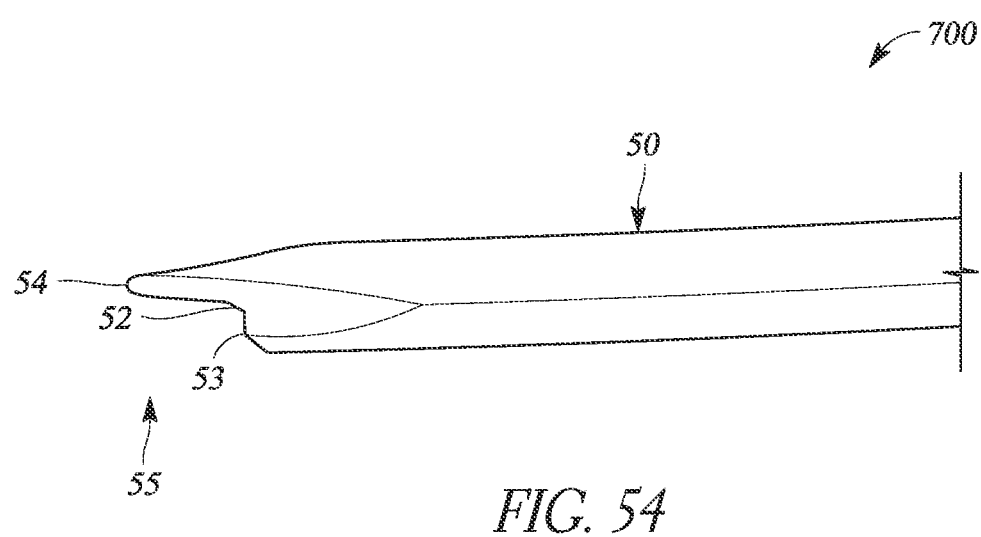
FIG. 54 is a side view of the shaped cutting wire from FIG. 53.
Figure 55:
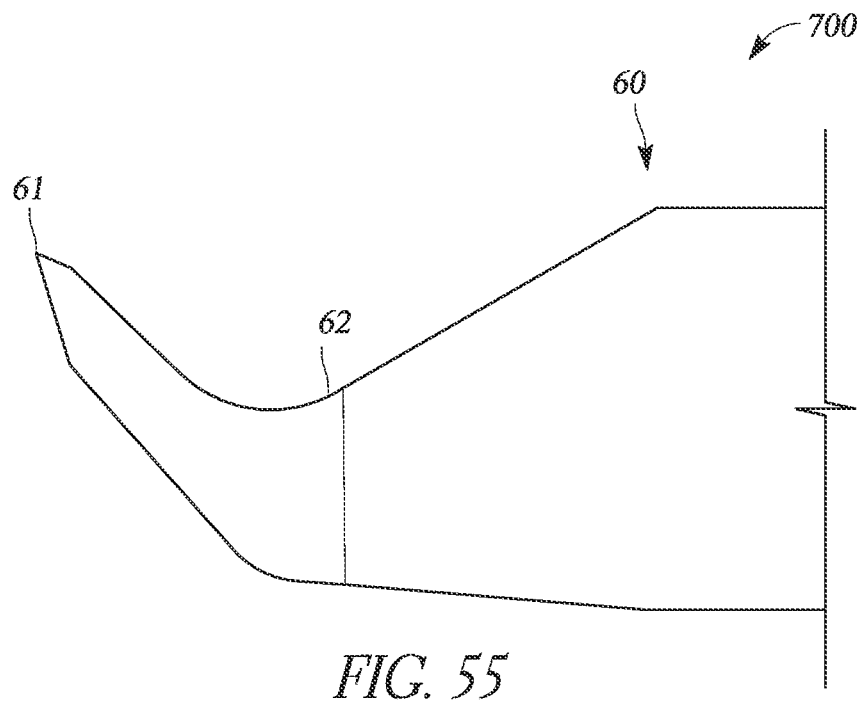
FIG. 55 is a side close-up view of another embodiment of a shaped cutting wire with a hook-like tip.
Figure 56:
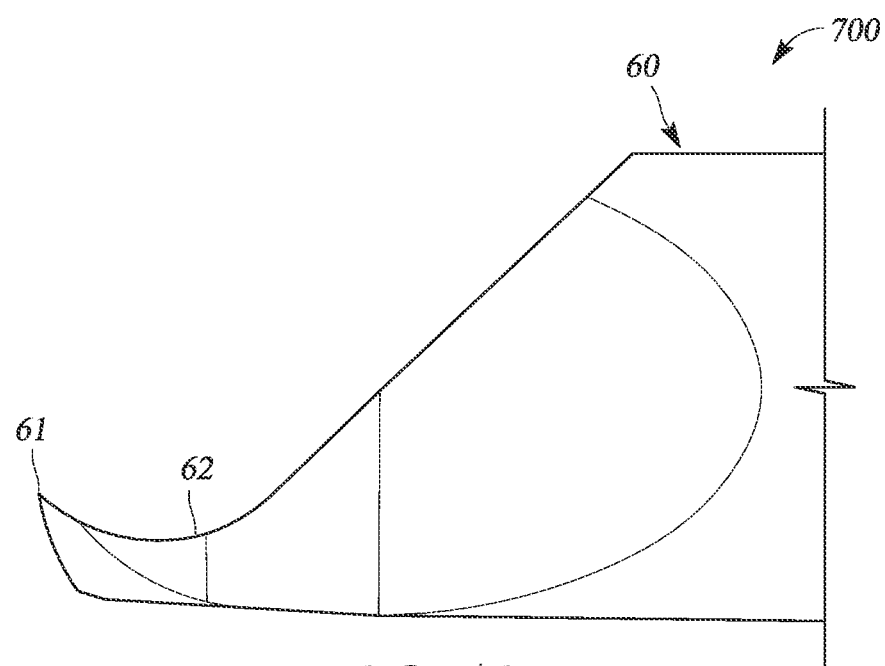
FIG. 56 is a perspective close-up view of the shaped cutting wire from FIG. 55.
Figure 57:
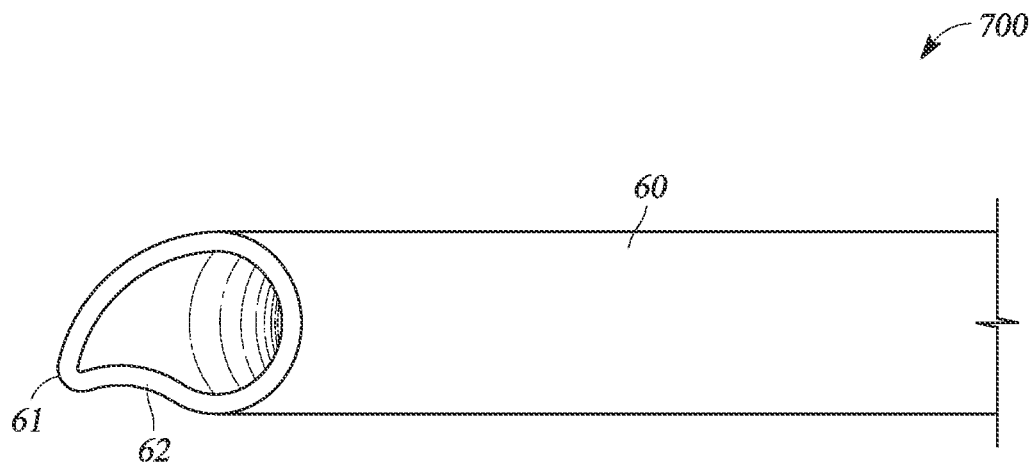
FIG. 57 is a perspective view of another embodiment of a shaped cutting wire with a hook-like tip.
Figure 58:
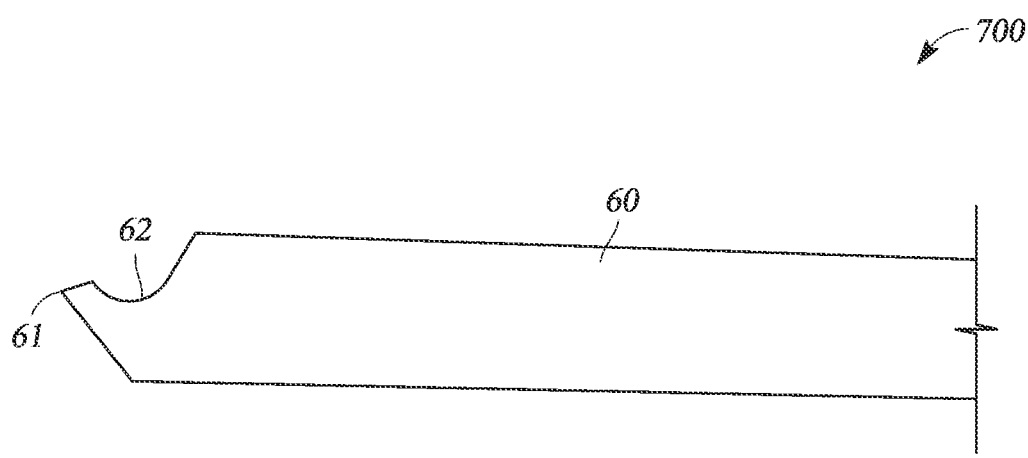
FIG. 58 is a side view of the shaped cutting wire from FIG. 57.

FIGS. 53 and 54 show an embodiment of the transseptal puncture device 700 including a shaped cutting wire 50. The shaped cutting wire 50 includes a sharp needle tip 55, which can be a hypodermic needle tip. In some embodiments, the shaped cutting wire 50 can include one or more cutouts 52 on the sharp needle tip 55 to create saw-tooth like tips or teeth 54 and 53. When rotation or oscillation is applied, the teeth 54 and 53 can easily and quickly cut their way through the tough septal wall tissue.

FIGS. 55-58 show another embodiment of the transseptal puncture device 700 including a shaped cutting wire 60. The shaped cutting wire 60 can include a hook-like tip 61 with a carved-out portion 62. The hook-like tip 61 and the carved-out portion 62 of the shaped cutting wire 60 may be used to pull and cut its way through the tough septal wall tissue when rotation or oscillation is applied.

Figure 59:
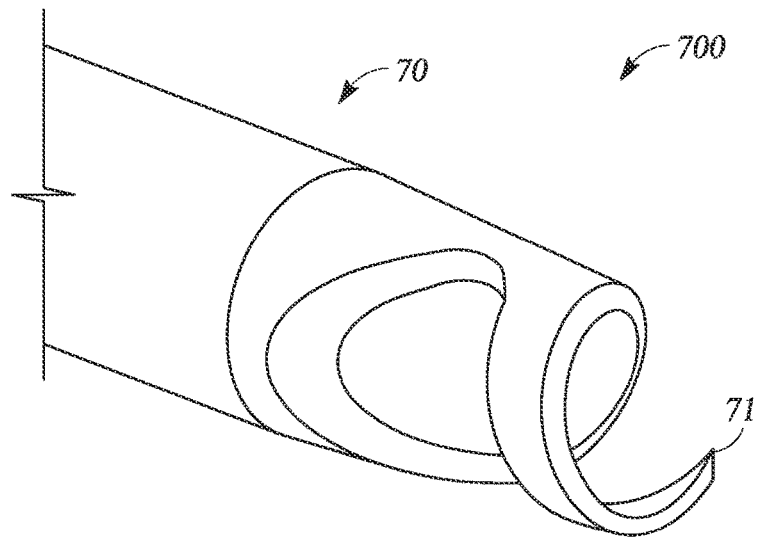
FIG. 59 is a perspective view of another embodiment of a shaped cutting wire with a coil-like tip.

FIG. 59 shows another embodiment of the transseptal puncture device 700 including a shaped cutting wire 70 with a coil-like hook-like tip 71, which may pull and cut its way through the tough septal wall tissue when rotation or oscillation is applied.

Figure 60:
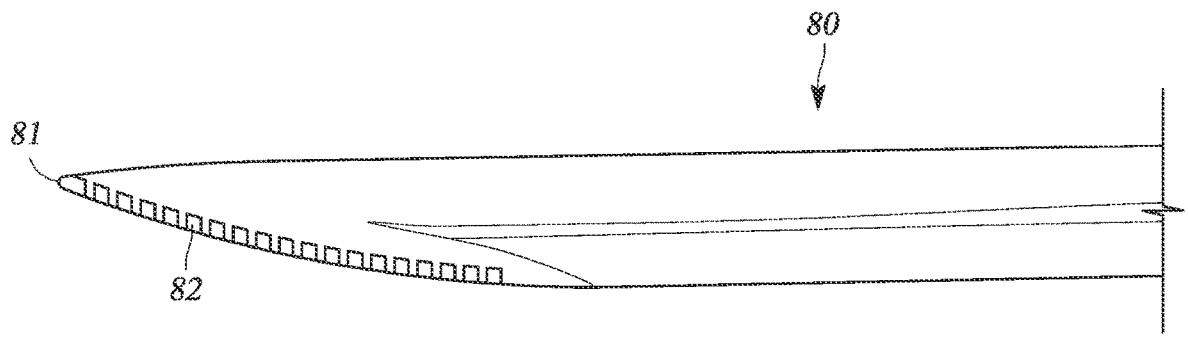
FIG. 60 is a side view of another embodiment of a shaped cutting wire with serrations.
Figure 61:
FIG. 61 is a perspective view of the shaped cutting wire from FIG. 60.

FIGS. 60 and 61 show another embodiment of the transseptal puncture device 700 including a shaped cutting wire 80 including a hypodermic (e.g., sharp) 81 at a distal end and small serrations 82 added to the sharp face or edges of the hypodermic 81. The serrations 82 can saw or cut their way through the septum tissue when rotation or oscillation is applied.

8. Shaped Cutting Wire (Needle) with Ultrasound

One inconvenience of rotating or oscillating a needle through tissue could be the number of cycles needed to pierce through challenging tissue. Another aspect of this disclosure includes an electromechanical motion generator configured to reduce the pressure needed to be applied by an operator to pierce through the tissue and improve user experience for the operator. An ultrasonic mechanical oscillator or other form of electromechanical vibration could be used, similar to an ultrasonic oscillator, such as and without limitation, as used in an ultrasonic toothbrush. Any embodiments of the transseptal puncture devices described herein can be configured to include an ultrasonic oscillator to selectively oscillate at least a distal portion of the transseptal puncture device.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree. The ranges disclosed herein also encompass any and all overlap, sub-ranges, and combinations thereof, and any specific values within those ranges. Language such as "up to," "at least," "greater than," "less than," "between," and the like includes the number recited. Numbers and values used herein preceded by a term such as "about" or "approximately" include the recited numbers. For example, "approximately 7 mm" includes "7 mm" and numbers and ranges preceded by a term such as "about" or "approximately" should be interpreted as disclosing numbers and ranges with or without such a term in front of the number or value such that this application supports claiming the numbers, values and ranges disclosed in the specification and/or claims with or without the term such as "about" or "approximately" before such numbers, values or ranges such, for example, that "approximately two times to approximately five times" also includes the disclosure of the range of "two times to five times." The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A transseptal puncture device for creating a hole in a septum of a patient, comprising:
   (a) an elongate body portion;
   (b) a coiled portion distal to the body portion, the coiled portion having a distal end and a proximal end, the proximal end being closer to the body portion;
   (c) a transition portion between the body portion and the coiled portion, wherein the transition portion comprises a sharpened outer edge; and
   (d) a longitudinally extending lumen extending axially through an entire length of the elongate body portion and the coiled portion; wherein:
      (1) the distal end of the coiled portion is sharp; and
      (2) the device is configured to create an opening in the septum of the patient by advancing the distal end of the coiled portion into contact with the septum and rotating the device in a first direction.

2. The device of claim 1, wherein the coiled portion comprises a helical wall having a thickness in an axial direction of the transseptal puncture device that increases along a length of the coiled portion from the distal end of the coiled portion to the proximal end of the coiled portion so as to increase a size of the opening in the septum as the coiled portion of the device is advanced through the opening in the septum.

3. The device of claim 2, wherein the thickness of the helical wall in the axial direction at the proximal end of the coiled portion is equal to or greater than an outer diameter of the coiled portion at the proximal end of the coiled portion.

4. The device of claim 2, wherein the thickness of the helical wall in the axial direction at a proximal end portion of the coiled portion adjacent to the proximal end of the coiled portion is at least twice as large as the thickness of the helical wall in the axial direction at a distal end portion of the coiled portion adjacent to the distal end of the coiled portion.

5. The device of claim 2, wherein the coiled portion comprises a gap between adjacent coils of the helical wall to thereby define a separation between a first coil and an adjacent second coil of the helical wall, wherein the gap has a constant width in an axial direction along a length of the coiled portion from the distal end of the coiled portion to the proximal end of the coiled portion.

6. The device of claim 5, wherein the gap comprises a first distal gap portion that is located at a distal portion of the coiled portion and is between adjacent coils of the helical wall and a second proximal gap portion that is located proximal to the first distal gap portion.

7. The device of claim 6, wherein the second gap portion is located at or adjacent to a transition portion of the transseptal puncture device, the transition portion being between the body portion and the coiled portion.

8. The device of claim 6, wherein the second gap portion extends in an axial direction that is approximately aligned with an axially extending centerline of the coiled portion.

9. The device of claim 6, further comprising a transitional gap portion between the second and first gap portions, wherein an angle of the transitional gap portion relative to an axial centerline of the coiled portion is different than an angle of the first gap portion relative to the axial centerline of the coiled portion.

10. The device of claim 2, wherein the coiled portion comprises a gap between adjacent coils of the helical wall to thereby define a separation between a first coil and an adjacent second coil of the helical wall, wherein the gap has a pitch or an angle relative to an axial centerline of the coiled portion that decreases along a length of the coiled portion from the distal end of the coiled portion to the proximal end of the coiled portion as the thickness of the helical wall increases along the length of the coiled portion from the distal end of the coiled portion to the proximal end of the coiled portion.

11. The device of claim 1, wherein at least the body portion of the transseptal puncture device is flexible.

12. The device of claim 1, wherein the lumen extending through the body portion and the coiled portion is configured to receive a guidewire or a needle therein.

13. The device of claim 12, further comprising a needle configured to move axially within the lumen through the body portion and the coiled portion.

14. The device of claim 1, further comprising a helical guard comprising a guard body portion and a guard helical portion, wherein the helical guard is configured to move axially within the lumen through the body portion and the coiled portion, and wherein a distal end of the guard helical portion is configured to be blunt or atraumatic.

15. The device of claim 14, wherein the guard helical portion is configured such that, when the guard helical portion is advanced through the coiled portion, the guard helical portion interwinds with the coiled portion.

16. The device of claim 1, further comprising a distal coil guard configured to retractably extend out from the distal end of the coiled portion, wherein a distal end of the distal coil guard is configured to be blunt or atraumatic.

17. The device of claim 1, wherein at least the coiled portion is laser cut from a tube.

18. The device of claim 1, wherein the distal portion of the coiled portion further comprising a hook-like tip.

19. The device of claim 1, wherein the coiled portion is formed from a wire or ribbon.

20. The device of claim 1, further comprising an electromechanical motion generator coupled with the body portion.

21. A transseptal puncture device for creating a hole in a septum of a patient, comprising:
   (a) an elongate body portion;
   (b) a coiled portion distal to the body portion, the coiled portion having a distal end and a proximal end, the proximal end being closer to the body portion, wherein the coiled portion comprises a helical wall having a thickness in an axial direction of the transseptal puncture device that increases along a length of the coiled portion from the distal end of the coiled portion to the proximal end of the coiled portion so as to increase a size of an opening in the septum as the coiled portion of the device is advanced through the opening in the septum; and
   (c) a longitudinally extending lumen extending axially through an entire length of the elongate body portion and the coiled portion; wherein:
      (1) the distal end of the coiled portion is sharp; and
      (2) the device is configured to create the opening in the septum of the patient by advancing the distal end of the coiled portion into contact with the septum and rotating the device in a first direction.

22. A transseptal puncture device for creating a hole in a septum of a patient, comprising:
(a) an elongate body portion;
(b) a coiled portion distal to the body portion, the coiled portion having a distal end and a proximal end, the proximal end being closer to the body portion;
(c) a distal coil guard configured to retractably extend out from the distal end of the coiled portion, wherein a distal end of the distal coil guard is configured to be blunt or atraumatic; and
(d) a longitudinally extending lumen extending axially through an entire length of the elongate body portion and the coiled portion; wherein:
(1) the distal end of the coiled portion is sharp; and
(2) the device is configured to create an opening in the septum of the patient by advancing the distal end of the coiled portion into contact with the septum and rotating the device in a first direction.

23. The device of claim 22, wherein at least the body portion of the transseptal puncture device is flexible.

24. The device of claim 22, wherein the lumen extending through the body portion and the coiled portion is configured to receive a guidewire or a needle therein.

25. The device of claim 22, further comprising an electromechanical motion generator coupled with the body portion.

26. The device of claim 22, wherein the coiled portion is formed from a wire or ribbon.

27. The device of claim 22, wherein the coiled portion comprises a helical wall having a thickness in an axial direction of the transseptal puncture device that increases along a length of the coiled portion from the distal end of the coiled portion to the proximal end of the coiled portion so as to increase a size of the opening in the septum as the coiled portion of the device is advanced through the opening in the septum.

* * * * *